US011776282B2

(12) United States Patent
Abbas

(10) Patent No.: US 11,776,282 B2
(45) Date of Patent: Oct. 3, 2023

(54) METHOD, APPARATUS, AND SYSTEM FOR REMOVING OUTLIERS FROM ROAD LANE MARKING DATA

(71) Applicant: HERE Global B.V., Eindhoven (NL)

(72) Inventor: Ali Abbas, Seligenstadt (DE)

(73) Assignee: HERE GLOBAL B.V., Eindhoven (NL)

(*) Notice: Subject to any disclaimer, the term of this patent is extended or adjusted under 35 U.S.C. 154(b) by 183 days.

(21) Appl. No.: 17/214,437

(22) Filed: Mar. 26, 2021

(65) Prior Publication Data
US 2022/0309281 A1    Sep. 29, 2022

(51) Int. Cl.
| | | |
|---|---|---|
| G06V 20/56 | (2022.01) | |
| G08G 1/00 | (2006.01) | |
| G08G 1/16 | (2006.01) | |
| G06F 18/23 | (2023.01) | |
| G06F 18/21 | (2023.01) | |
| G06F 18/2413 | (2023.01) | |

(52) U.S. Cl.
CPC ......... *G06V 20/588* (2022.01); *G06F 18/217* (2023.01); *G06F 18/23* (2023.01); *G06F 18/24147* (2023.01); *G08G 1/202* (2013.01)

(58) Field of Classification Search
None
See application file for complete search history.

(56) References Cited

U.S. PATENT DOCUMENTS 9,384,394 B2    7/2016  Joshi et al.
11,210,537 B2 * 12/2021  Koivisto ............... G06V 10/46
(Continued)

FOREIGN PATENT DOCUMENTS

CN    110503151 B  * 11/2020
CN    112131914 A  * 12/2020  ............ B60W 40/06
(Continued)

OTHER PUBLICATIONS

Boutteau et al., "Road-line detection and 3D reconstruction using fisheye cameras", retrieved from https://hal.archives-ouvertes.fr/hal-01710406/document, Feb. 15, 2018, 7 pages.
(Continued)

*Primary Examiner* — Mohammed Rachedine
(74) *Attorney, Agent, or Firm* — John J. McKearin; HERE GLOBAL B.V.

(57) ABSTRACT

An approach is provided for removing outliers from road lane marking data (e.g., using two-phase filtering). The approach involves processing spatial data points representing a road lane into clusters, and filtering cluster(s) away from a main cluster from the clusters to generate an initial filtered data point set. The approach also involves calculating a degree of relationship among the data points of the initial filtered set based on a distance metric to generate group node(s) of the initial filtered set. The approach further involves for each group node, determining a probability that a spatial data point belongs in said each group node by comparing the spatial data point to a center of said each group node, and filtering the spatial data point from said each group node based on determining that the probability is less than a threshold to generate a final filtered data point set.

20 Claims, 20 Drawing Sheets

(56) References Cited

U.S. PATENT DOCUMENTS

| | | | |
|---|---|---|---|
| 2013/0253753 A1 | 9/2013 | Burnette et al. | |
| 2016/0091609 A1 | 3/2016 | Ismail et al. | |
| 2019/0325236 A1* | 10/2019 | Zaba | G06F 16/2246 |
| 2020/0249684 A1* | 8/2020 | Onofrio | G05D 1/0219 |
| 2021/0166052 A1* | 6/2021 | Park | G06N 3/045 |
| 2022/0116452 A1* | 4/2022 | Rafey | G06F 18/24137 |
| 2022/0121867 A1* | 4/2022 | Arar | G06V 20/588 |

FOREIGN PATENT DOCUMENTS

| | | | | |
|---|---|---|---|---|
| CN | 113011285 A | * | 6/2021 | G06K 9/00798 |
| CN | 113701764 A | * | 11/2021 | G05D 1/0219 |

OTHER PUBLICATIONS

Hota et al., "A Simple and Efficient Lane Detection using Clustering and Weighted Regression", retrieved from https://www.cse.iitb.ac.in/~comad/2009/proceedings/l2_3.pdf, Jan. 2009, 8 pages.

Sun et al., abstract of "Unsupervised video-based lane detection using location-enhanced topic models", Oct. 1, 2010, 3 pages.

\* cited by examiner

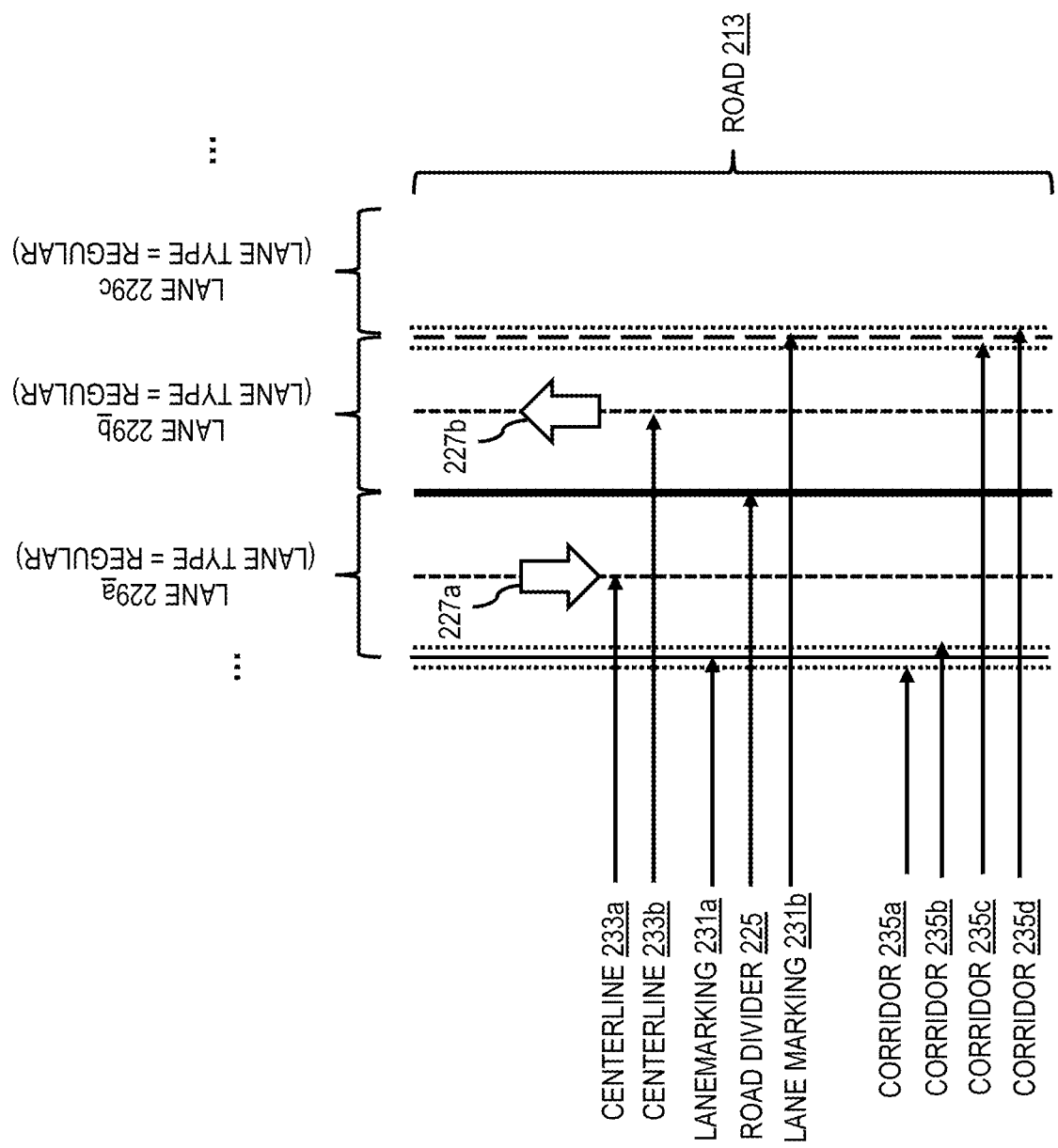

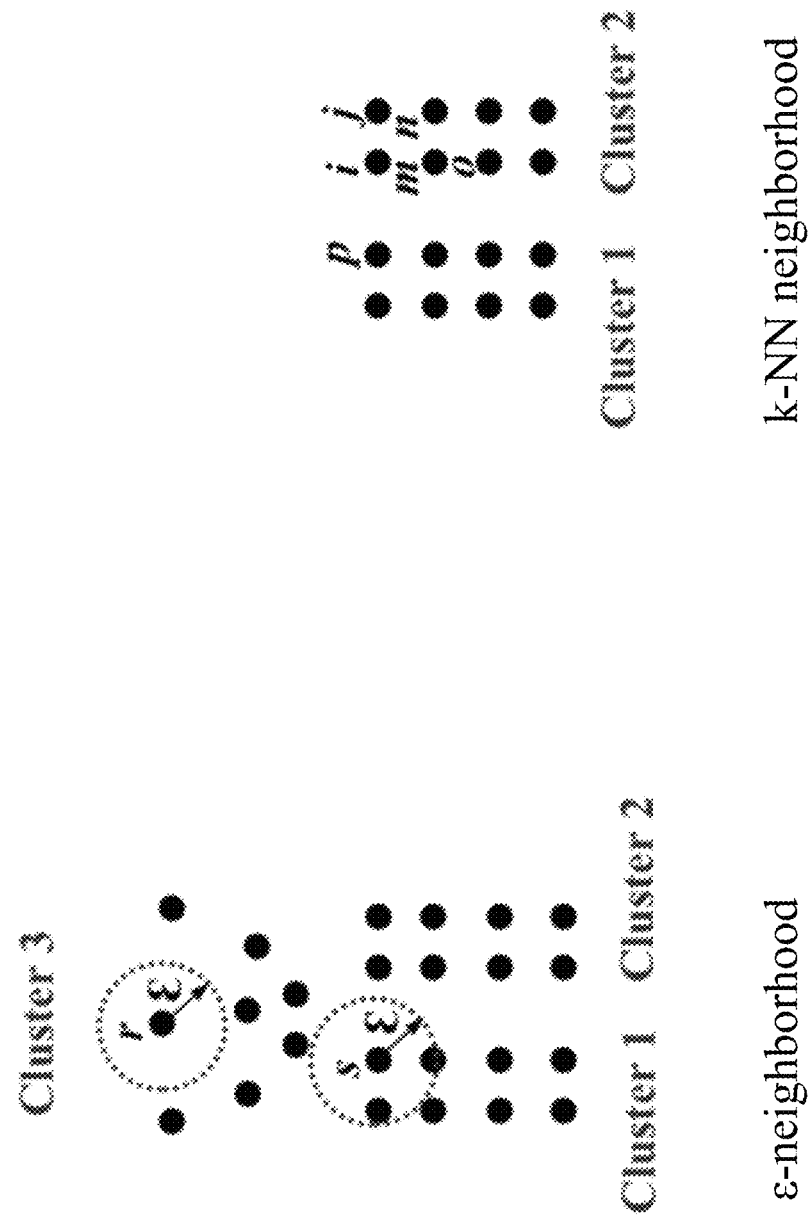

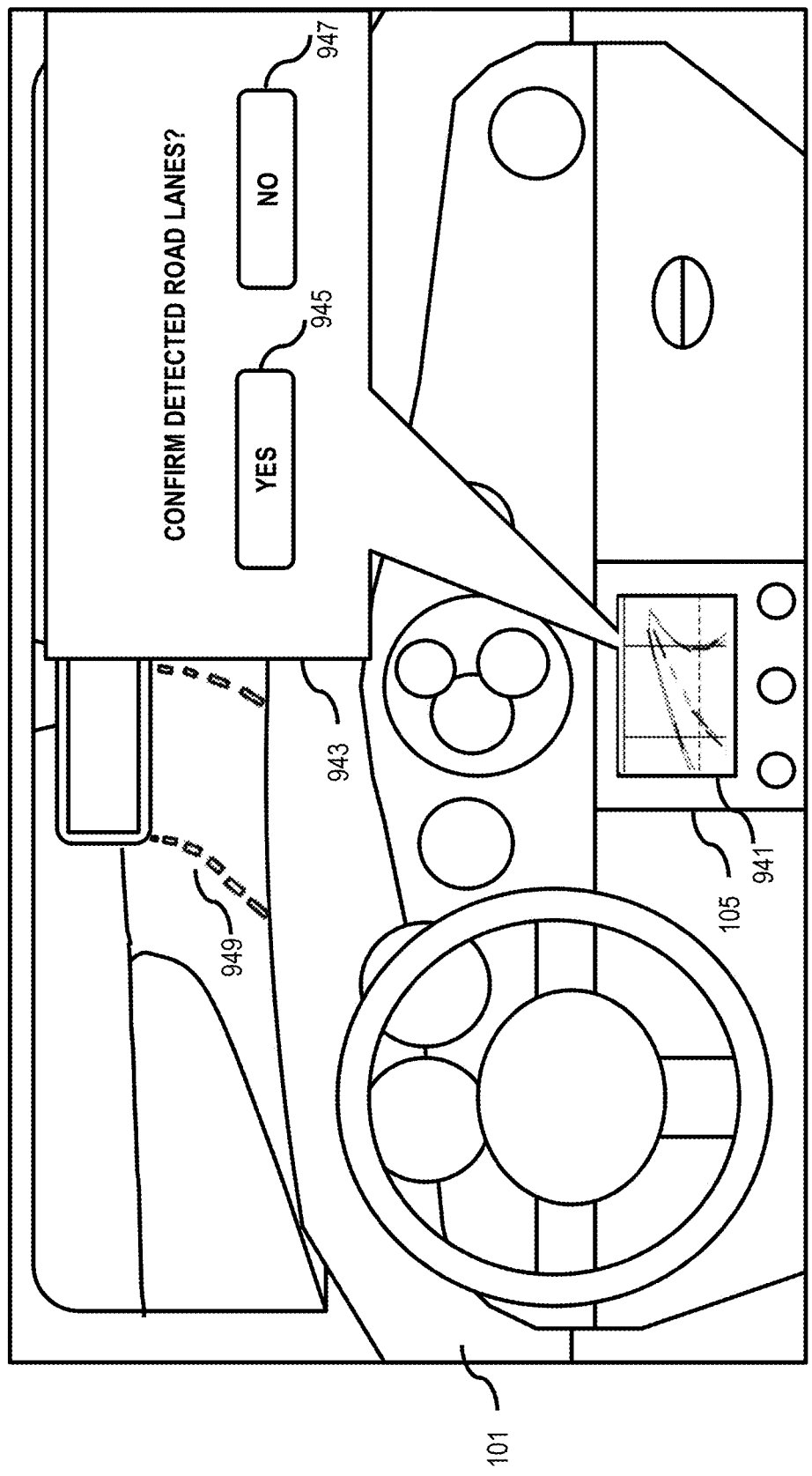

METHOD, APPARATUS, AND SYSTEM FOR REMOVING OUTLIERS FROM ROAD LANE MARKING DATA

BACKGROUND

Navigation and mapping service providers rely on generating and maintaining digital maps to provide a range of services and applications. These digital maps often include digitized representations of various geospatially referenced map features (e.g., road lanes) that are continually updated from a variety of sources. Lane detection enables a vehicle to stay within the lanes, as well as to handle a road merger or split, especially for autonomous driving. However, after complex visual processing (as part of an ingestion pipeline) on data created by vehicles that index the road to generate lane marking data (e.g., polylines or link/node-based representations of road lanes), navigation and mapping service providers still need to filter false positive lane marking data due to noise (e.g., similar lines on roadsides) and uncertainty of the pre-processed digitized map representations. Navigation and mapping service providers face significant technical challenges with respect to noise reduction from the lane marking data.

SOME EXAMPLE EMBODIMENTS

Therefore, there is a need for removing outliers from road lane marking data (e.g., using two-phase filtering) thereby providing digital map data and related services and applications.

According to one embodiment, a method comprises processing spatial data points representing a road lane into a plurality of clusters. The method also comprises filtering one or more clusters from the plurality of clusters to generate an initial filtered set of the spatial data points. The filtering is based on determining that the one or more clusters is away from at least one main cluster by at least a threshold. The method further comprises calculating a degree of relationship among the spatial data points of the initial filtered set based on a distance metric to generate one or more group nodes of the initial filtered set. The method further comprises for each group node of the one or more group nodes, determining a probability that a spatial data point belongs in said each group node by comparing the spatial data point to a center of said each group node, and filtering the spatial data point from said each group node based on determining that the probability is less than a threshold probability to generate a final filtered set of the spatial data points. The method further comprises providing the final set filtered set as an output.

According to another embodiment, an apparatus comprises at least one processor, and at least one memory including computer program code for one or more computer programs, the at least one memory and the computer program code configured to, with the at least one processor, cause, at least in part, the apparatus to process spatial data points representing road lanes to remove one or more miss-identified road lanes therefrom. The apparatus is also caused to generate a road lane map layer based on the processed spatial data points. The apparatus is further caused to provide the road lane map layer as an output. The spatial data points are processed into a plurality of clusters, one or more clusters are filtered from the plurality of clusters to generate an initial filtered set of the spatial data points, and the filtering is based on determining that the one or more clusters is away from at least one main cluster by at least a threshold. A degree of relationship is calculated among the spatial data points of the initial filtered set based on a distance metric to generate one or more group nodes of the initial filtered set. For each group node of the one or more group nodes, a probability that a spatial data point belongs in said each group node is determined by comparing the spatial data point to a center of said each group node, and filtering the spatial data point from said each group node based on determining that the probability is less than a threshold probability to generate a final filtered set of the spatial data points. The one or more miss-identified road lanes include the one or more clusters away from the at least one main cluster, the spatial data point with the probability less than the threshold probability, or a combination thereof.

According to another embodiment, a computer-readable storage medium carries one or more sequences of one or more instructions which, when executed by one or more processors, cause, at least in part, an apparatus to monitor one or more miss-identified road lanes determined from spatial data points overtime. The spatial data points are received from one or more sources. The apparatus is also caused to compute a false rate based on the one or more miss-identified road lanes associated with the one or more sources. The apparatus is further caused to provide the false rate as an output. The spatial data points are processed into a plurality of clusters, one or more clusters are filtered from the plurality of clusters to generate an initial filtered set of the spatial data points, and the filtering is based on determining that the one or more clusters is away from at least one main cluster by at least a threshold. A degree of relationship is calculated among the spatial data points of the initial filtered set based on a distance metric to generate one or more group nodes of the initial filtered set. For each group node of the one or more group nodes, a probability that a spatial data point belongs in said each group node is determined by comparing the spatial data point to a center of said each group node, and filtering the spatial data point from said each group node based on determining that the probability is less than a threshold probability to generate a final filtered set of the spatial data points. The one or more miss-identified road lanes include the one or more clusters away from the at least one main cluster, the spatial data point with the probability less than the threshold probability, or a combination thereof.

According to another embodiment, an apparatus comprises means for processing spatial data points representing road lanes to remove one or more miss-identified road lanes therefrom. The apparatus also comprises means for generating a road lane map layer based on the processed spatial data points. The apparatus further comprises means for provide the road lane map layer as an output. The spatial data points are processed into a plurality of clusters, one or more clusters are filtered from the plurality of clusters to generate an initial filtered set of the spatial data points, and the filtering is based on determining that the one or more clusters is away from at least one main cluster by at least a threshold. A degree of relationship is calculated among the spatial data points of the initial filtered set based on a distance metric to generate one or more group nodes of the initial filtered set. For each group node of the one or more group nodes, a probability that a spatial data point belongs in said each group node is determined by comparing the spatial data point to a center of said each group node, and filtering the spatial data point from said each group node based on determining that the probability is less than a threshold probability to generate a final filtered set of the spatial data points. The one or more miss-identified road lanes include the one or more clusters away from the at least one main cluster, the spatial data point with the probability less than the threshold probability, or a combination thereof.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 2C illustrates the components of a road that can be included in a final road lane representation, according to one embodiment;

FIG. 2E is a diagram illustrating an example distance-based ε-neighborhood, according to one embodiment;

FIG. 2F is a diagram illustrating an example KNN neighborhood, according to one embodiment;

FIGS. 9A-9C are diagrams of example map user interfaces for removing outliers from lane marking data, according to various embodiments;

DESCRIPTION OF SOME EMBODIMENTS

Examples of a method, apparatus, and computer program for removing outliers from road lane marking data (e.g., representation of road lanes or other cartographic/map features) are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Location-based services and applications generally rely on map data that include accurate and up-to-date digital representations of map features located in the mapped geographic area. These map features can include but are not limited to road lanes, buildings, terrain features, etc. By way of example, lane detection is a crucial step in the development of intelligent vehicles. Road segments, specifically highways are composed of multiple lanes whose primary aim is to improve traffic flow while avoiding collision. Many countries might have different regulations on how lanes should be used but mostly they converge toward the universal rule that lanes use correlate to vehicle speed as well as road merger or road split (e.g., exiting or entering highways).

Figure 1:
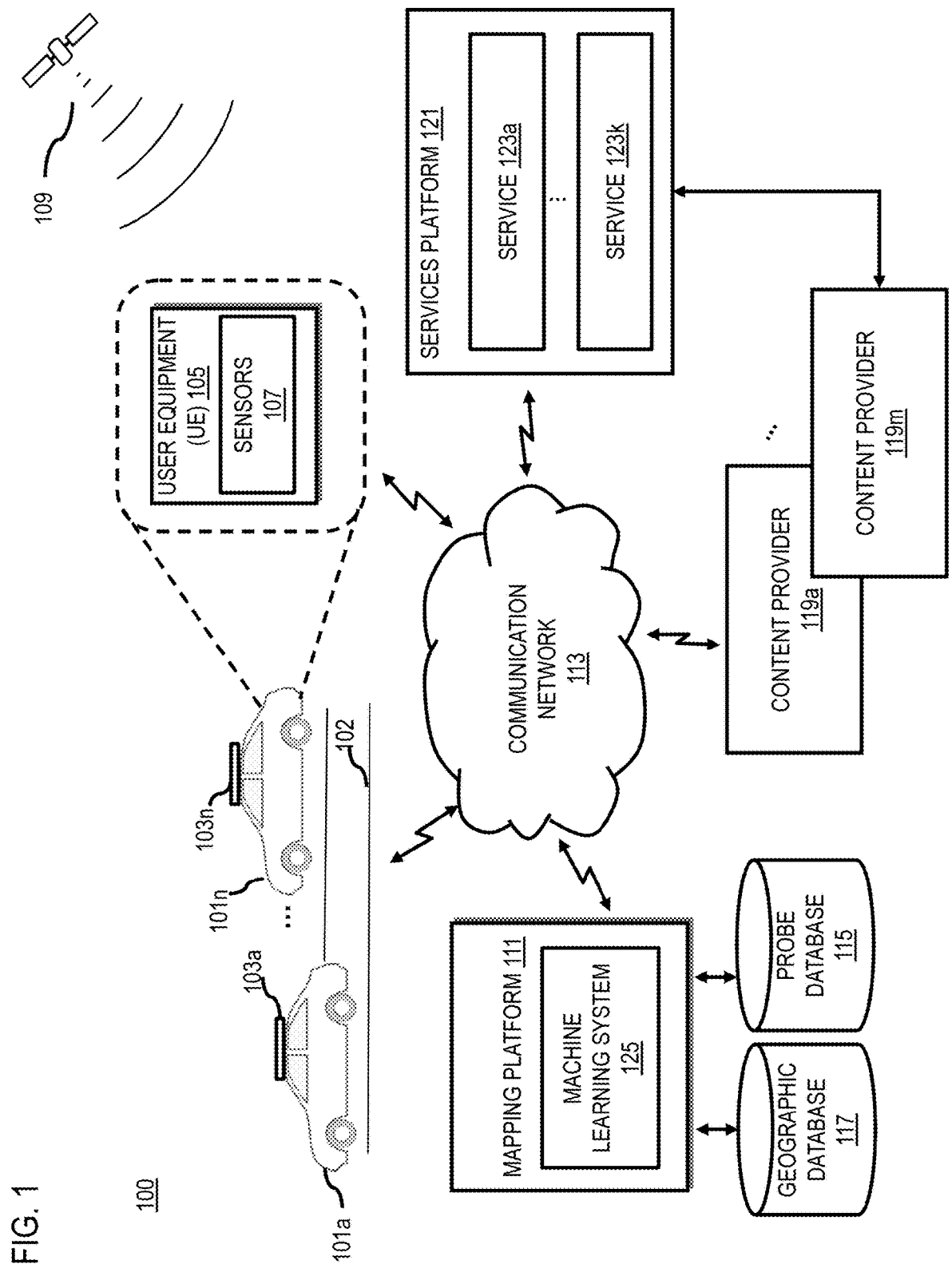
FIG. 1 is a diagram of a system capable of removing outliers from road lane marking data, according to one embodiment.

FIG. 1 is a diagram of a system 100 capable of removing outliers from road lane marking data (using two-phase filtering), according to one embodiment. As discussed above, autonomous driving has quickly become an area of intense interest, with recent advances in machine learning, computer vision and computing power enabling real-time mapping and sensing of a vehicle's environment. Such an understanding of the environment enables autonomous, semi-autonomous, or highly assisted driving in vehicles 101a-101n (also collectively referred to as vehicles 101) within lanes defined by lane markings 102.

In general, a localization accuracy of around 10 cm is needed for safe driving in many areas. One way to achieve this level of accuracy is for vehicles to use real-time computer vision to detect lane markings. Concurrently or alternatively, the system 100 can collect then provide the vehicles 101 with centimeter-level or better accuracy of lane marking features.

Mapping service providers can identify lanes using complex visual processing algorithms as a part of an ingestion pipeline supported by vehicles equipped with sensors (e.g., Lidar, cameras, etc.) that index roads and create a representation of the roads, which is prepared for later processing including lane identification and extraction. Some vehicles equipped with intelligent chip (e.g., MobilEye® chip) can perform real-time lane detection using built-in camera sensors and onboard computer vision algorithms (e.g., random sample consensus (RANSAC) plus Kalman filters). Such lane detection algorithms can process images based on road geometry and pixel color changes that are continuous and distinct from the road color. However, lane markings can be brittle (e.g., old, poorly painted, color-faded, etc.) and not persist in different environmental and lighting conditions (e.g., dirt-covered, invisible due to weather or other hazards, etc.), or there can be similar lines on roadsides to be confused as lane markings. These issues can lead false positive lane detection, which means a line was detected as a lane but in reality it is not a lane. False positives can cause real damages for self-driving vehicles as they can drive into area that is not really a lane.

Figure 2A:
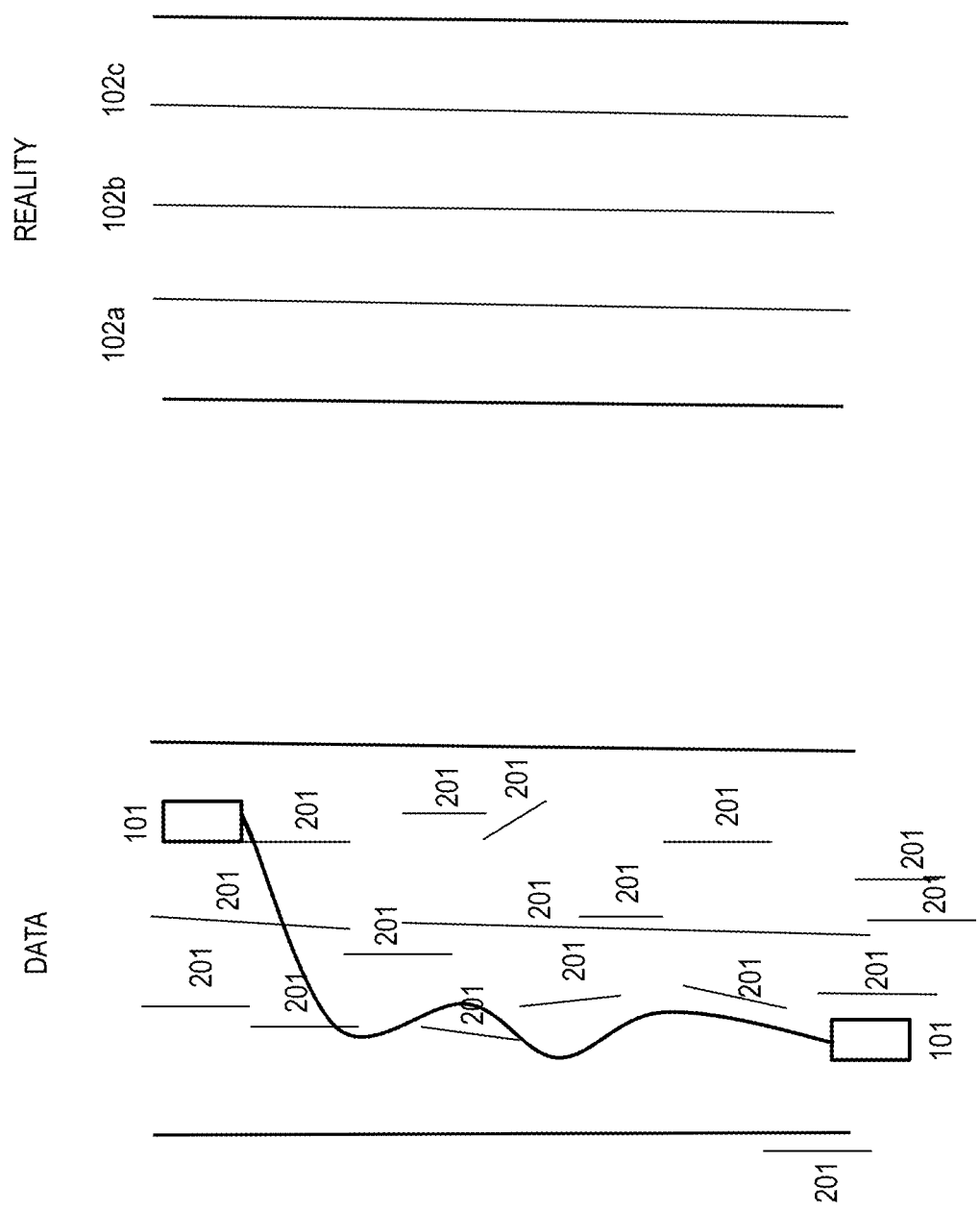
FIG. 2A illustrates example lane marking data collected by a vehicle, according to one or more embodiments.

FIG. 2A illustrates example lane marking data collected by a vehicle, according to one or more embodiments. In this case, the vehicle 101 is moving at a high speed while sensing real-world lane marking 102a-102c on the right side of FIG. 2A. The collected data thus becomes fragments 201 as shown on the left side of FIG. 2A. Some mapping service providers employ human annotators to mark false lane fragments. Some mapping service providers use machine learning (e.g., supervised learning") to detect false lane fragments which requires abundant and reliable data to learn and infer which one a true lane is.

To address to these issues, the system 100 can remove noise from the data collected by the vesicle 101, thereby determining what is a lane and what is not and achieve a low false positive converges, without additional data or human intervention. In one embodiment, the system 100 requires no added data than the data being processed and no human intervention, via an end to end automation of data noise (e.g., false positives) reduction. Hereinafter, such noise or miss-identified lanes are referred as outliers.

Road lanes can be represented as a grouped data structure with each lane representation being a data element up to the total number of lanes on the given road section, or can be represented as an individual entity itself that is loosely coupled across neighboring lanes as well as to the underlying road.

In one embodiment, considering that each lane is represented as an individual entity, each lane representation can be referenced or described with respect to a centerline geometry of the lane, boundary geometry of the lane ("corridor"), or both. Also, each lane representation can have attribute data that further characterizes the lane using attributes that are not related to the geometry of the lane. For example, attribute data can include attributions such as but not limited to direction of travel, speed, vehicles allowed, functional class, color, etc.

Figure 2B:
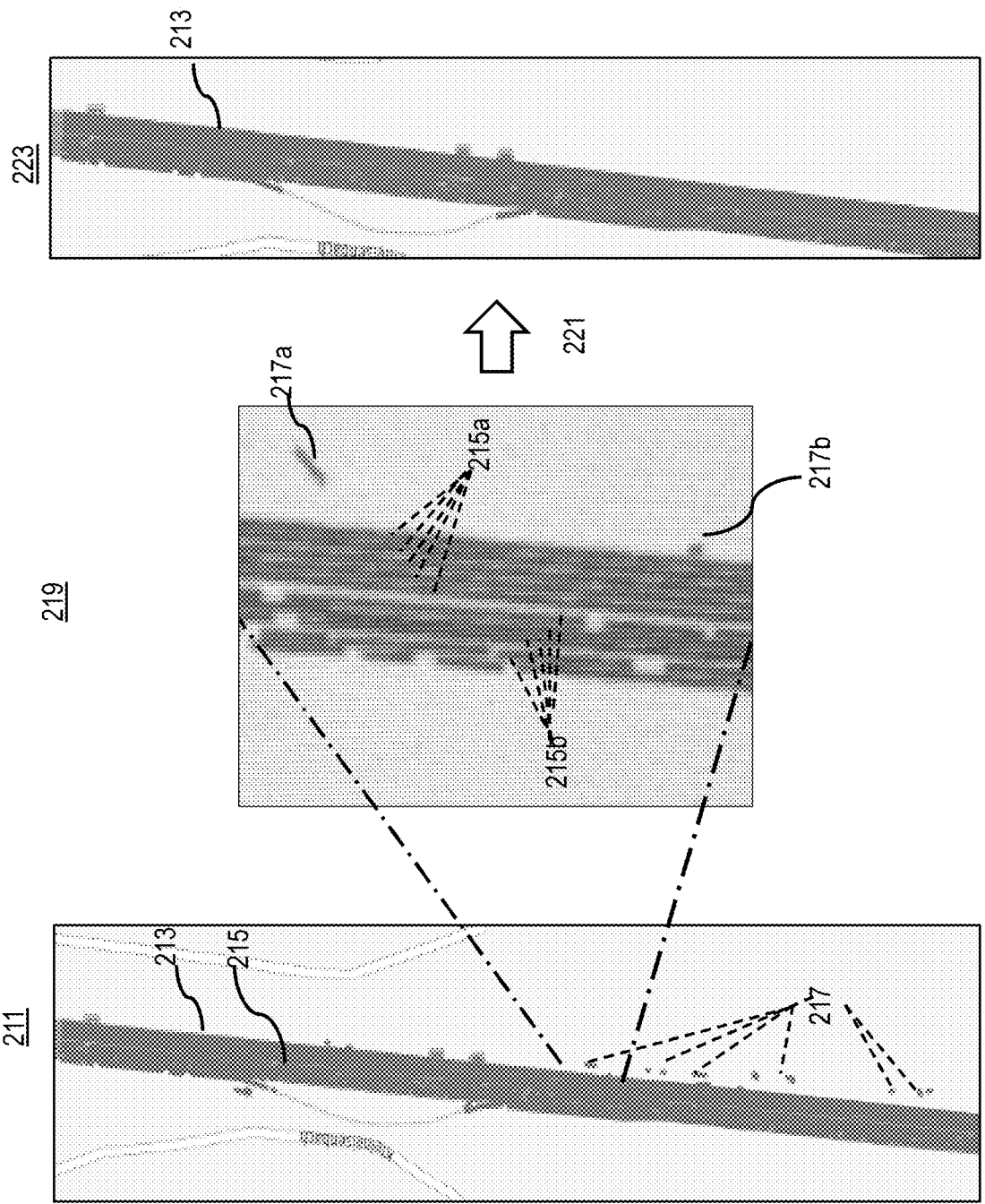
FIG. 2B illustrates outputs of a pre-processing system and the system of FIG. 1, according to various embodiments.

FIG. 2B illustrates outputs of a pre-processing system and the system of FIG. 1, according to various embodiments. As shown in a diagram 211, an output of the pre-processing system (e.g., the lane detection system using computer vision) including various corridors 215 and outliers 217 with respect to a road 213. In the center of FIG. 2B, a diagram 219 is an enlarged view of one section of the road 213 that depicts five corridors 215a on one side of the road 213 and the other five corridors 215b on the opposite side of the road 213. The diagram 219 also depicts two example outliers: one outlier 217a away from the road 213, and the other outlier 217b close to the road 213.

In one embodiment, the system 100 can apply a two-phase filtering process 221 on the output points as shown in the diagram 211 of the pre-processing system to detect and remove outliers into a lane into the lane representation in a diagram 223. As shown in the diagram 223, the system 100 can remove all false negatives and accurately preserve lanes merged from corridors.

For instance, the two-phase filtering process 221 can include an initial/first filtering that can divide the set of data points in the diagram 211 into clusters, label in such a way to filter extremities. Extremities can points that are far away from the geometrical density of most of the points (e.g., the outlier 217a away from the road 213). Once extremities are removed, the two-phase filtering process 221 can start an subsequent/second filtering by applying a nearest neighbor search, and feeding the data into a local optimizer to generate probabilities. These probabilities can be used to further filter/remove outliers, for example, that are above the top 99 percentile of the probability distribution (e.g., the outlier 217b close to the road 213).

Based on the output of the subsequent/second filtering, the system 100 can connect/merge the filtered fragments into logical lane markings of a road (e.g., the road 213) as shown in FIG. 2C. FIG. 2C illustrates the components of a road (e.g., the road 213) that can be included in a final road lane representation, according to one embodiment. As shown, the road 213 includes a road divider 225 between two travel directions 227a, 227b, five road lanes one each sides (e.g., 229a-229c as examples). The representations of the lanes 229a-229c can be based on their respective lane markings 231a, 231b, etc. and centerlines 233a, 233b, etc., and may also reference respective lane corridors/boundaries 235a-235d. The representation of linear features such as the lane markings 231a, 231b, etc., the centerlines 233a, 233b, etc., and the corridors/boundaries 235a-235d can be based on polylines, links/nodes, or other equivalent representations.

Figure 2D:
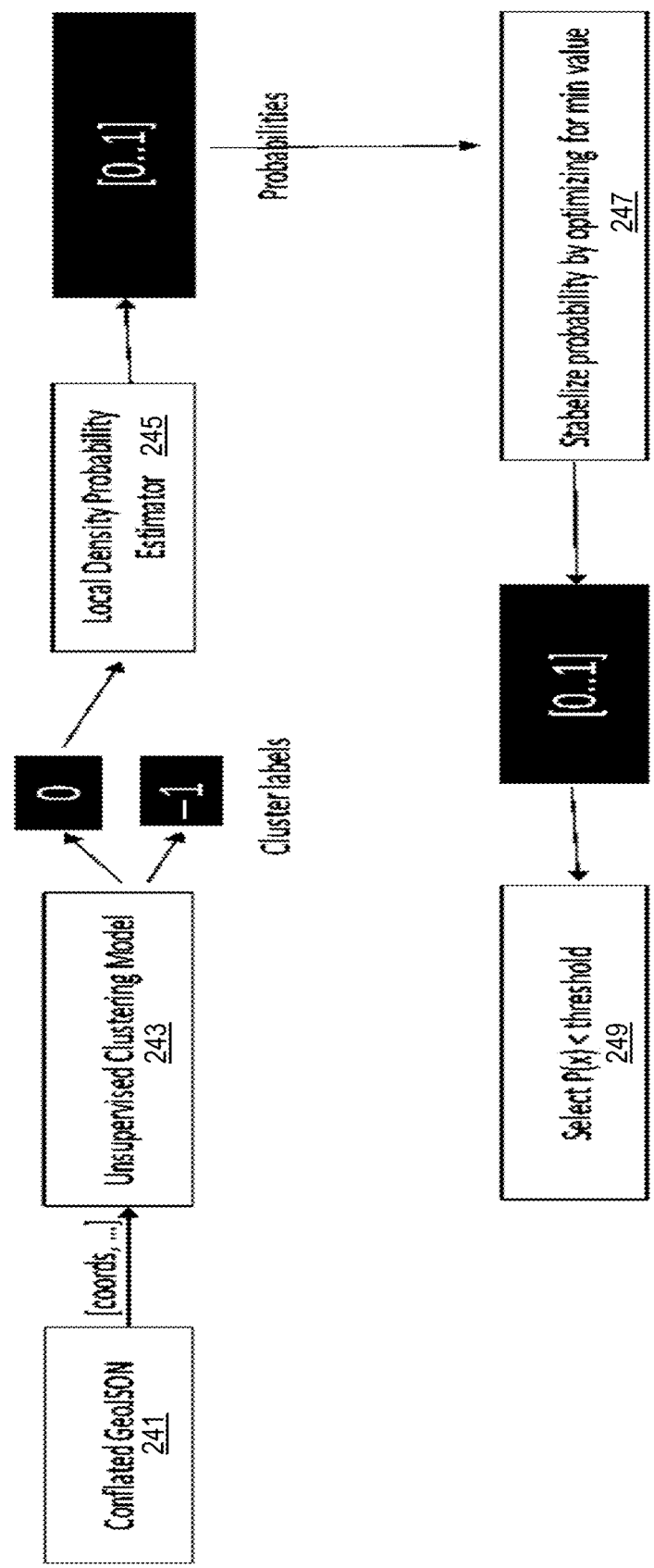
FIG. 2D is a diagram illustrating an example two-phase filtering process, according to one embodiment.

The system 100 can pre-process (e.g., computer vision, conflation, etc.) raw sensor data from the vehicles 101 itself, or retrieve the output data points (e.g., as shown in the diagram 211) from one or more pre-processing systems. Mapping service providers can apply road network conflation (i.e., merge multiple data sets without creating a new data set) to process geospatial lane marking data (e.g., geoJSON) from a variety of geospatial databases of public or private organizations (e.g., original equipment manufacturers, OEMs). In FIG. 2D, the system 100 can run the pre-processed data (e.g., conflated geoJSON data 241) via the two-phase filtering process.

For instance, the pre-processed data points of geographic or geospatial lane markings can be represented through various mechanisms or formats. One example representation is a geoJSON representation which is an open mapping and data interchange standard that uses text (e.g., linear text strings) to describe a geographical feature simply yet effectively with locations (e.g., geographic coordinates) and attributes. It is noted that geoJSON is provided by way of illustration and not as a limitation, and that it is contemplated that any type of cartographic representation that includes both feature geometry data and related attribute data can be used.

In one embodiment, lane features on a given section of road can be easily represented independently in geoJSON format as a linear geospatial string along with their specific attributions. This lane representation can have reference to its boundaries separately, where each boundary can be represented through a different geoJSON or equivalent representation itself. Additionally, the underlying road could be referenced as well for the given lane.

Each type of this geographical feature in geoJSON would essentially pertain to encapsulate a specific category of content to satisfy respective business needs of end users (e.g., encapsulate specific attributes types selected by the end users) while adhering to the prescribed standard.

The format for the representation includes but is not limited to geoJSON, and the lanes can be represented independently as single lanes or grouped together in multi-lane representations. In one embodiment, the representation can group multiple lanes of a road into a single geoJSON representation. An example of this type of multiple lane representation is illustrated in Table 1 below. In the example of Table 1 two lane representations occurring on a road is appended together using a geoJSON representation. The geoJSON of Table 1 includes separate sections for each lane, with each section describing the lane geometry, lane attributes, associated boundaries, and associated underlying road.

TABLE 1

Example: Multiple Lanes On A Given Road In geoJSON

```
{
  "type": "FeatureCollection",
  "features": [
    {
      "id":
      "15af5c01-e415-41e0-8132-f9c23def6dad",
      "type": "Feature",
      "geometry": {
        "type": "LineString",
        "coordinates": [
          [
            -83.11112486327369,
            42.39341436797087,
            0.0
          ],
          [
            -83.10898565385118,
            42.39422126316387,
            0.0
          ]
        ]
      },
      "properties": {
        "laneboundaryReference": [
          {
            "featureId":
            "c1c441fb-b7af-4b0d-b378-0feefb9c68ff",
            "side": "LEFT"
          },
          {
            "featureId":
            "c89e5e31-5a3b-4dbb-b6d2-21aff7abcf2b",
            "side": "RIGHT"
          }
        ],
        "travelDirection": "BACKWARD",
        "typeofLane": "REGULAR",
        "vehiclesAllowed": [
          "BUS",
          "CAR",
          "TRUCK"
        ],
        "roadReference": {
          "id":
          "de942a29-bf6a-4dba-ba1d-bc6d9286f456",
          "lengthInMeters": 61.215507852245686
        }
      }
    },
    {
      "id":
      "549a5561-2c4a-4a3c-b27b-1252a8233a7b",
      "type": "Feature",
      "geometry": {
        "type": "LineString",
        "coordinates": [
          [
            -83.11114689599856,
            42.393446461271076,
            0.0
          ],
          [
            -83.10900768576843,
            42.39425335687064,
            0.0
          ]
        ]
      },
      "properties": {
        "laneboundaryReference": [
          {
            "featureId":
            "c89e5e31-5a3b-4dbb-b6d2-21aff7abcf2b",
            "side": "LEFT"
          },
          {
            "featureId":
            "43c5f31b-3158-4fle-be77-c5a4f5202869",
            "side": "RIGHT"
          }
        ],
        "travelDirection": "FORWARD",
        "typeofLane": "REGULAR",
        "vehiclesAllowed": [
          "BUS",
          "CAR",
          "TRUCK"
        ],
```

TABLE 1-continued

Example: Multiple Lanes On A Given Road In geoJSON

```
            "roadReference": {
                "id":
                "de942a29-bf6a-4dba-ba1d-bc6d9286f456",
                "lengthInMeters": 61.215507852245686
            }
        }
    }
  ]
}
```

Referring back to FIG. 2D, in one embodiment, the system 100 can parse the pre-processed data (e.g., conflated geoJSON data 241) to extract the [lat, long] coordinates of each point that was identified by the pre-processing system(s) as being a part of a lane. The system 100 then can create a cluster structure using a first unsupervised learning model 243 (e.g., the OPTICS algorithm) to establish clusters of all the geometrical reference points. Data point labels are determined in this phase of neighborhood construction. Once the cluster labels "0" or "−1" are established for each cluster, the system 100 can drop the cluster(s) labeled with "−1" and identified as further away from one or more main clusters (e.g., the outlier 217a away from the road 213). This provides us an initial filtered set of data points (of the cluster(s) labeled with "0") representing lanes and remove the far outliers.

During the unsupervised cluster labelling, the first unsupervised learning model 243 can apply a neighborhood construction algorithm (e.g., OPTICS) to learn the intrinsic cluster density structure of all points of an represented lane geometry (e.g., in the diagram 211). For instance, a neighborhood can be determined by a simple epsilon (ε) based on two factors: a neighborhood radius and an epsilon distance. Points that are closer than a given distance ε form the neighborhood. FIG. 2E is a diagram illustrating an example distance-based ε-neighborhood, according to one embodiment. In FIG. 2E, the neighborhood of point s includes points from the same cluster, Cluster 1, while the neighborhood of point r is empty, even though it is not an outlier. When the value of the epsilon is chosen too small, there is a strong tendency for a point (e.g., point r) in the respective radius to have no neighbors thus being taken as an outlier by mistake. The selection of inappropriate parameters can cause a decline in the efficiency epsilon in this approach. On the other hand, when a wide neighborhood radius is chosen, it is likely that the different points from different groups may integrate into each other and form a single group.

OPTICS calculates cosine distances among the data points, the number of the data points in a data set should exceed a given number to form a new cluster, and the last cluster separates the residual samples from the other clusters. In the process of mean-shift of OPTICS, the mean of offset of current data point is calculated at first, the next data point is decided based on the current data point and the offset. Finally, the iteration will continue until some criteria are met. In this method, the last cluster separates the residual data points from the other clusters. For this reason, in most cases, the size of the last cluster exceeds that of the other clusters. OPTICS can identify meaningful clusters in the clusters with different densities and overcome shortcomings of ε-neighborhood such as being sensitive to the radius of the neighborhood, the minimum number of points in a neighborhood, etc.

In one embodiment, the first unsupervised learning model 243 can apply OPTICS on all data points of an represented lane geometry (e.g., in the diagram 211) using an absolute distance (e.g., a cosine distance) represented by the lowest epsilon-neighborhood (e.g., the last cluster) that satisfies a minimum number of points. For instance, the absolute distance can stand for a lane distance.

The first unsupervised learning model 243 then can compute a reachability to any other core neighbors of this point to any neighbor, such as the smallest radius needed from P to P' is satisfied, to make P "density-reachable" from P'. The first unsupervised learning model 243 ends up with the labels: 0 and −1. The first unsupervised learning model 243 can select only the clusters where the label is 0, for computing a local density probability as follows.

The system 100 then can use a local density probability estimator 245 to calculate a degree of relationship among the initially filtered points, for example, using a nearest neighbor search algorithm to define and cluster neighborhood data. In one embodiment, the local density probability estimator 245 can use a distance metric known as the Haversine distance to calculate a local density probability for each of the initially filtered points. In short, the local density probability estimator 245 can calculate a great circle distance between two points using the respective [lat, long] of each initially filtered point relative to the earth surface.

For instance, to determine local density probability outlier(s), the local density probability estimator 245 can use the new filtered set of data points to computer a K-nearest neighbor search (k-NN) of the [lat, long] representation of each data point using the Haversine distance. k-NN chooses the data sets that are similar to each other to determine clusters, which is simple and highly useful in determining neighborhood based distance and locations of the points, without considering statistical rules and geometric structures. Basically, clustering can form groups of points based on a measure of similarity so that the similarities between the points inside the same group are high, while the similarities of the points from different groups are low. FIG. 2F is a diagram illustrating an example KNN neighborhood, according to one embodiment. In FIG. 2F, there are two clusters: a KNN neighborhood of point i in Cluster 2 including points from the same cluster, i.e., points j, m, and n, when k≤3, while point p in Cluster 1.

This is another unsupervised learning model which returns clusters (e.g., as a neighbor matrix) and their relative distances (e.g., as a distance matrix). The local density probability estimator 245 can calculate clusters/groups and respective group node that is a representative (a center) of a cluster/group of similar points, regardless of their density in the data set. After obtaining all the group/cluster nodes, the local density probability estimator 245 then can calculate in each group node, the probability of each points compared to the center of the node. The two-matrix representation of the set is then used to compute a local density probability as follow. For each data point, the local density probability estimator 245 can compute the local reachability density by taking the average 'reachability distance' from the data point to its neighbors. The local density probability estimator 245 can then calculate the average local reachability density of all the neighbors, and divide the average local reachability density by the local reachability density of each point. For instance, a value of 1 represents a dense region, and a value of 0 represents a less dense region.

The local density probability estimator 245 can scale the reachability values to [0, 1] probabilities. The probability values are in a range between 0 to 1, 1 being the utmost from all points compared to the center of the node in which the point belongs to.

In step 247 of FIG. 2D, the system 100 can stabilize the probability distribution p(x) by optimizing with a minimum value. For instance, the system 100 can filter data points with a probability value over a threshold (e.g., 99%) of the probability distribution p(x) as outliers that are to be removed from the set. In other words, the system 100 can generate a quantile distribution of the probabilities previously calculated, and drop all the data points which ends at the 99 percentiles of the distribution tail. The rest of data points (i.e., p(x)<threshold) that represent lanes are kept to generate lane representation (such as the diagram 223 in FIG. 2B) in step 249 of FIG. 2D. In one embodiment, the kept data points may go through a type conversion to be able to work on a desired map.

In the diagram 223 in FIG. 2B, the road 213 includes four lanes on each side classified as regular road lanes (e.g., Lane Type=Regular) that support vehicular traffic. The representations of the lanes can be based on their respective centerlines and may also reference their respective boundaries as shown in FIG. 2C. The representation of linear features such as lane markings, centerlines and boundaries/corridors can be based on polylines, links/nodes, or other equivalent representations. In short, the system 100 can highly effectively remove outliers from lane marking data without expensive compute nodes, human intervention, or additional data.

For example, one mechanism to generate cartographic representations (e.g., road lane representations) is to collect image data and/or probe data from the vehicles 101 equipped with respective sensors 103a-103n (also collectively referred to as sensors 103) as the vehicles 101 travel over a road network. In some use causes, user equipment (UE) devices 105 (e.g., smartphones, personal navigation devices, etc.) equipped with respective sensors 107 can also be used to generate image data and/or probe data. The sensors 103 and 107 can include cameras, positioning sensors (e.g., Global Positioning System (GPS) receivers configured to receive location signals from positioning satellites 109), etc. In this way, the vehicles 101 and/or UE 105 can periodically sample and report image data and/or probe data to a mapping platform 111 over a communication network 113 for storage in a probe database 115 and/or a geographic database 117.

The mapping platform 111 can then process the image data using computer vision as discussed to determine pre-processed lane marking data. In addition, the mapping platform 111 can process the probe data to determine probe trajectories for identifying and generating cartographic representations (e.g., road lane representations using polylines or links/nodes). However, the positioning systems (e.g., GPS) used to generate probe data generally has positioning errors of several meters or more depending environmental conditions. This positioning error can then get carried to some degree to the resulting cartographic representations. Therefore, the pre-processed lane marking data based on image data is preferred. In some cases, the mapping platform 111 receives the image data and/or the pre-processed lane marking data from third parties (e.g., content providers 119a-119m, services platform 121, and/or any of the services 123a-123k of the services platform 121).

Figure 3:
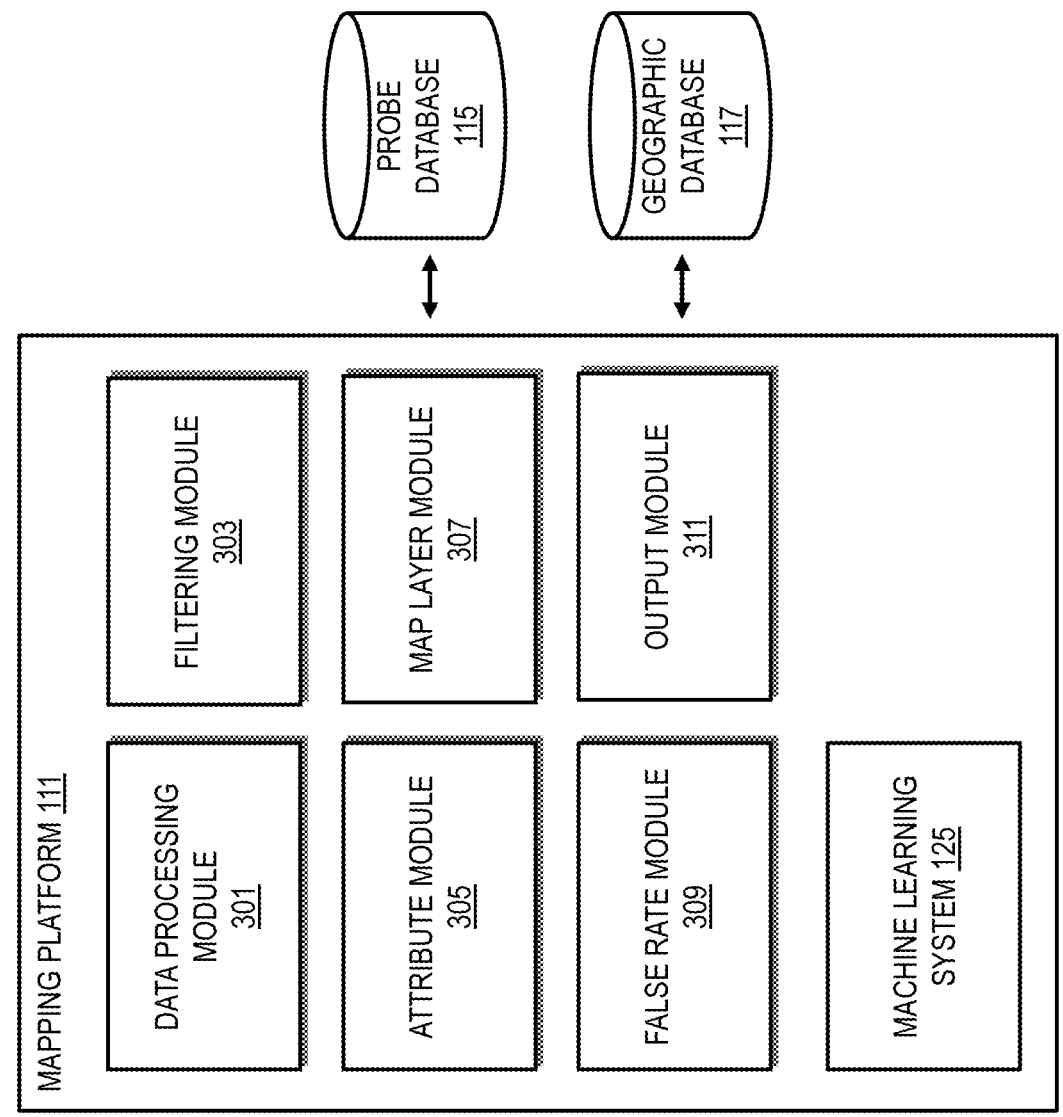
FIG. 3 is a diagram of components of a mapping platform capable of removing outliers from road lane marking data, according to one embodiment.

In one embodiment, the system 100 includes the mapping platform 111 for performing the functions associated with removing outliers from road lane marking data according to the various embodiments described herein. As shown in FIG. 3, in one embodiment, the mapping platform 111 includes one or more components and a machine learning system 125 for performing these functions. It is contemplated that the functions of these components may be combined or performed by other components of equivalent functionality. As shown, in one embodiment, the mapping platform 111 includes a data processing module 301, a filtering module 303, an attribute module 305, a map layer module 307, a false rate module 309, an output module 311, and the machine learning system 125. The above presented modules and components of the mapping platform 111 can be implemented in hardware, firmware, software, or a combination thereof. Though depicted as a separate entity in FIG. 1, it is contemplated that the mapping platform 111 may be implemented as a module of any of the components of the system 100 (e.g., a component of services platform 121, services 123, content providers 119, etc.). In another embodiment, one or more of the modules 301-311 may be implemented as a cloud-based service, local service, native application, or combination thereof. The functions of the mapping platform 111 and modules 301-311 are discussed with respect to FIGS. 4-9 below.

Figure 4:
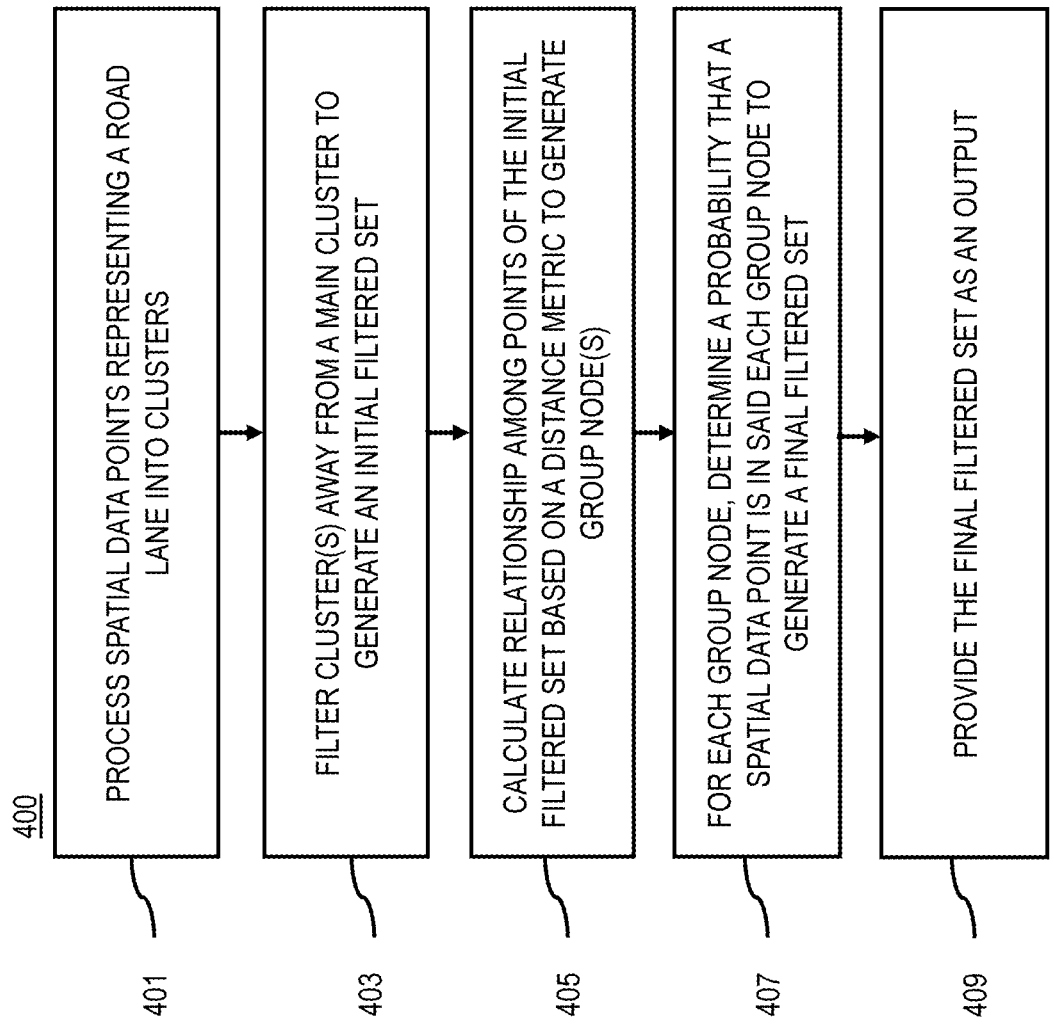
FIG. 4 is a flowchart of a process for removing outliers from road lane marking data, according to one embodiment.
Figure 12:
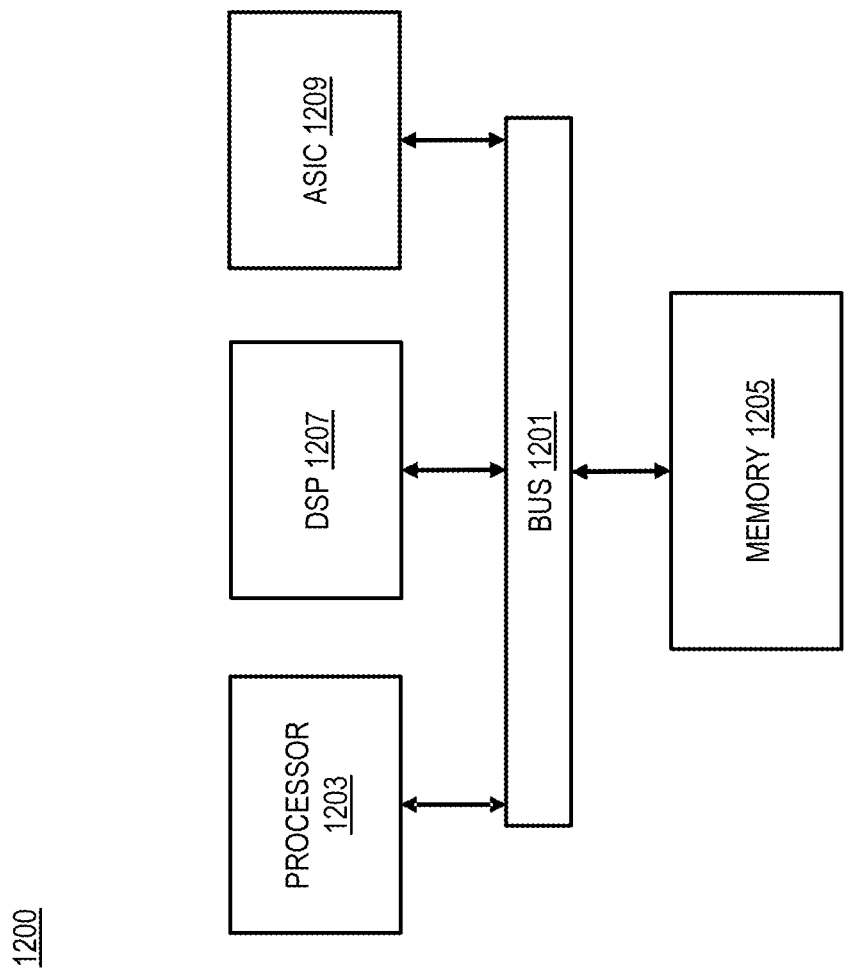
FIG. 12 is a diagram of a chip set that can be used to implement an embodiment.

FIG. 4 is a flowchart of a process 400 for removing outliers from road lane marking data, according to one embodiment. In various embodiments, the mapping platform 111, any of the modules 301-311, and/or the machine learning system 125 may perform one or more portions of the process 400 and may be implemented in, for instance, a chip set including a processor and a memory as shown in FIG. 12. As such, the mapping platform 111, any of the modules 301-311, and/or the machine learning system 125 can provide means for accomplishing various parts of the process 400, as well as means for accomplishing embodiments of other processes described herein in conjunction with other components of the system 100. Although the process 400 is illustrated and described as a sequence of steps, it is contemplated that various embodiments of the process 400 may be performed in any order or combination and need not include all of the illustrated steps.

The data processing module 301 can pre-process (e.g., computer vision, conflation, etc.) raw sensor data from the vehicles 101 itself, or retrieve spatial data points (e.g., the pre-processed data, such as the conflated geoJSON data 241 in FIG. 2D) representing a road lane (e.g., in the road 213 of the diagram 211 in FIG. 2B) from one or more pre-processing systems.

In one embodiment, for example in step 401, the data processing module 301 can work in conjunction with the machine learning system 125 to process the spatial data points (e.g., the conflated geoJSON data 241 in FIG. 2D) representing the road lane (e.g., a lane 215 of the diagram 219 in FIG. 2B) into a plurality of clusters. In one embodiment, the processing of the spatial data points into the plurality of clusters can be performed using unsupervised cluster labeling. For instance, the unsupervised cluster labeling can be based on an unsupervised machine learning model (e.g., the first unsupervised learning model 243, such as the OPTICS algorithm) that learns an intrinsic cluster structure of the spatial data points from an absolute distance represented by a lowest epsilon neighborhood that satisfies a minimum number of points that stand for a lane distance (for example, thereby labeling each cluster "0" or "−1").

In one embodiment, in step 403, the filtering module 303 can filter one or more clusters (i.e., the cluster(s) labeled with "−1" and identified as further away from one or more main clusters, e.g., the outlier 217a away from the road 213) from the plurality of clusters to generate an initial filtered set of the spatial data points (i.e., the cluster(s) labeled with "0"). The filtering is based on determining that the one or more clusters is away from at least one main cluster by at least a threshold.

In one embodiment, in step 405, the filtering module 303 can calculate a degree of relationship among the spatial data points of the initial filtered set based on a distance metric to generate one or more group nodes of the initial filtered set (for example, using a nearest neighbor search algorithm to define and cluster neighborhood data).

In one embodiment, the generating of the one or more group nodes is based on another unsupervised machine learning model (e.g., a K-nearest neighbor search (k-NN) of the [lat, long] representation of each data point using the Haversine distance) that returns the one or more group nodes and relative distances of the one or more group nodes, and the probability that a spatial data point is in said each group node is based on the relative distances. For instance, the other unsupervised machine learning model can compute a nearest neighbor search using the distance metric, and the distance metric can be a Haversine distance.

In one embodiment, in step 407, for each group node of the one or more group nodes, the filtering module 303 can determine a probability that a spatial data point belongs in said each group node by comparing the spatial data point to a center of said each group node, and filter the spatial data point from said each group node based on determining that the probability is less than a threshold probability to generate a final filtered set (e.g., as in the diagram 223 of FIG. 2B) of the spatial data points.

In one embodiment, the filtering module 303 can determine the probability of said spatial data point (e.g., the local density probability) by: computing a local reachability density by averaging a reachability distance from the spatial data point of said each group node to neighboring data points in said each group node, computing an average local reachability density of the neighboring data points in said each group node, and dividing the average local reachability density by the local reachability density to determine a local density probability. For instance, the spatial data point can be filtered from said each group node based on determining that the local density probability is less than a threshold probability (e.g., 99%).

In one embodiment, the filtering module 303 can scale the local density probability to a range of zero to one. For instance, a value of one can represent a dense region and a value of zero can represent a less dense region.

In one embodiment, the filtering module 303 can generate a probability distribution based on the local density probability. For example, the probability distribution can be a quantile distribution. In this case, the spatial data point can be filtered from said each group node based on the local density probability being located within a tail threshold of the probability distribution. For instance, the filtering module 303 can stabilize the probability distribution p(x) by optimizing with a minimum value. For instance, the filtering module 303 can filter data points with a probability value over a threshold (e.g., 99%) of the probability distribution p(x) as outliers that are to be removed from the set (e.g., in step 249 of FIG. 2D). In other words, the filtering module 303 can generate a quantile distribution of the probabilities previously calculated, and drop all the data points which ends at the 99 percentiles of the distribution tail. The rest of data points are kept and converted back to geometrical points that represent lanes to generate lane representation (such as the diagram 223 in FIG. 2B).

In addition, the filtering module 303 can determine a value of the tail threshold to optimize for recall with respect to false negative lane markings. Recall is the ability of a model to find all the relevant cases (e.g., outliers) within a data set, by optimizing the model for a high recall ratio. Recall is the ratio of true positives (classified as positives and are positives) to true positives plus false negatives (classified as negatives but are actually positives).

In another embodiment, the filtering module 303 can change a value of the tail threshold to optimize for recall with respect to false negative lane markings, based on one or more criteria. For instance, the one or more criteria can include switching between a manual driving mode and an autonomous driving mode, switching between a populated area and a rural area, or a combination thereof.

Figure 5A:
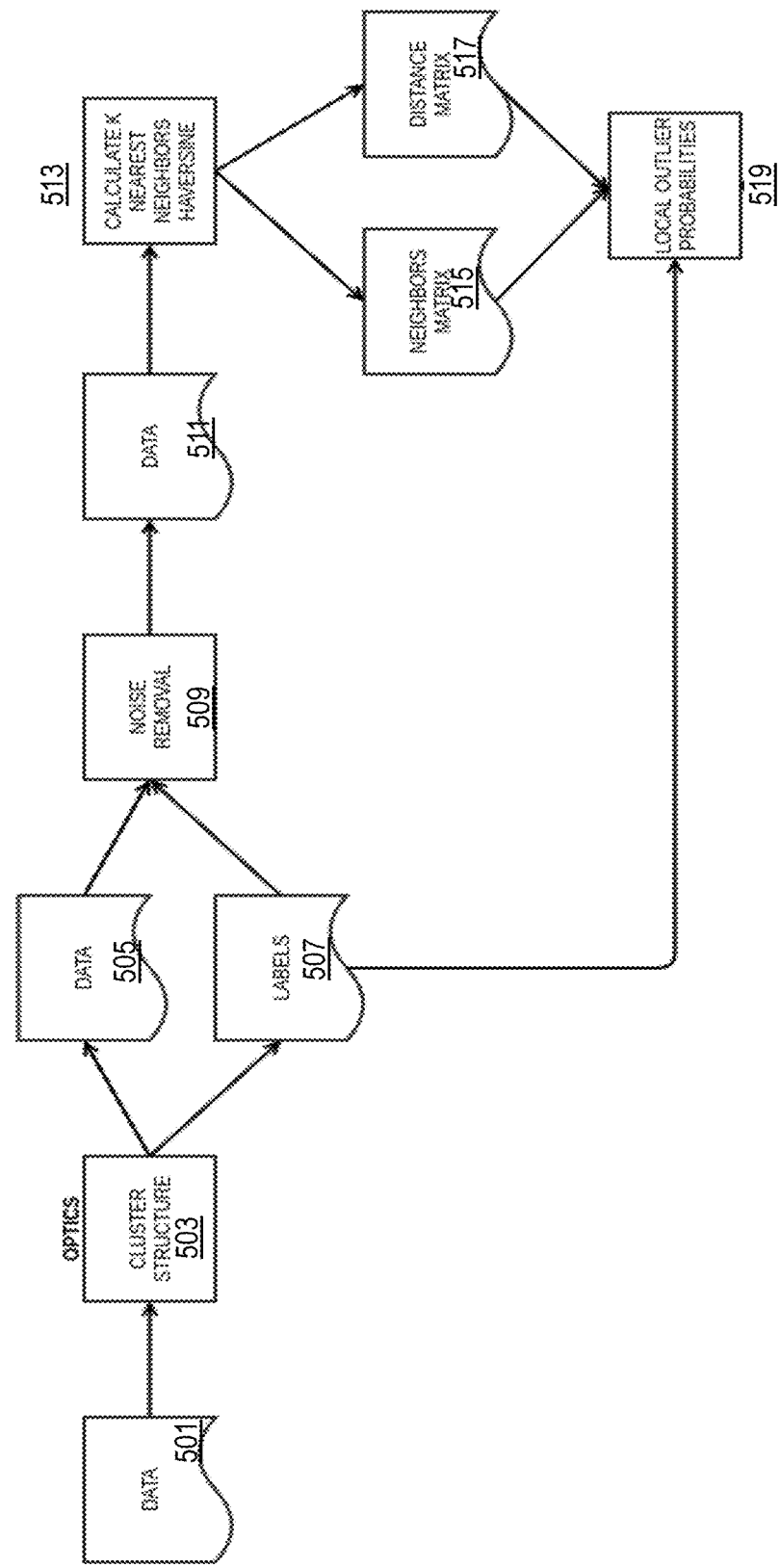
FIGS. 5A-5B are data flow diagrams illustrating an example two-phase filtering process, according to one or more embodiments.
Figure 5B:
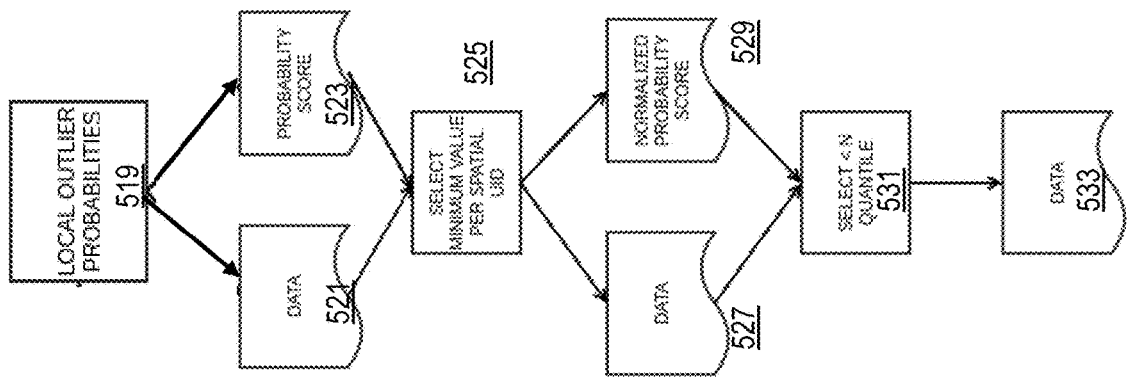

FIGS. 5A-5B are data flow diagrams illustrating an example two-phase filtering process of FIG. 2D, according to one or more embodiments. In FIG. 5A, the filtering module 303 can parse the pre-processed data 501 (e.g., conflated geoJSON data 241) to extract the [lat, long] coordinates of each point that was identified by the pre-processing system(s) as being a part of a lane. The filtering module 303 then can create a cluster structure 503 using the OPTICS algorithm to establish clusters of all the geometrical reference points 505 and their respective labels 507 in the first phase of neighborhood construction. Once the cluster labels "0" or "−1" are established for each cluster, the filtering module 303 can remove noise 509 (i.e., the cluster(s) labeled with "−1" and identified as further away from one or more main clusters, e.g., the outlier 217a away from the road 213) from the pre-processed data 501 as an initial filtered set of data points 511 (i.e., of the cluster(s) labeled with "0").

The filtering module 303 then can calculate a degree of relationship among the initially filtered points, for example, using a K-nearest neighbor search (k-NN) algorithm on of the [lat, long] representation of each initially filtered data point using the Haversine distance to calculate the change of data densities (e.g., density=1/distance) and their relative distances in step 513. This second unsupervised learning model returns clusters (e.g., as a neighbor matrix 515) and their relative distances (e.g., as a distance matrix 517). The filtering module 303 can calculate local density probabilities for each data point in a respective cluster/group. The bigger local density probability, the smaller the local outlier probability 519 (i.e., the more unlikely the data point is an outlier). On the other hand, the smaller local density probability, the bigger the local outlier probability 519 (i.e., the more likely the data point is an outlier).

In FIG. 5B, the filtering module 303 can scale the local density probability values of the processed data 521 into local density probability scores 523 in the range of [0, 1]. For instance, the local density probability values are in a range between 0 to 1, 1 being the utmost from all points compared to the center of the node in which the point belongs to.

For instance, the filtering module 303 can aggregate the data points in a cluster based on their geospatial IDs into a list of probabilities of the cluster (e.g., 0.6, 0.7, 0.8, 0.9 . . . ), which may diverge but the majority (non-outliers) have almost the same probability since they are close to each other. Geospatial IDs indicate the data points are geographically close to one another. For instance, spatial objects can be assigned with tile UIDs.

In step 525, the filtering module 303 can select a minimum probability value (e.g., 0.1) in a list of probabilities (e.g., 0.1, 0.12, 0.14, . . . 0.9) of a cluster, and provide the data 527 of one cluster with the minimum probability value as the representative probability score of the cluster (i.e., the normalized probability score 529 of the cluster), instead of one probability score for each point in the cluster prior to the normalization. The filtering module 303 can stabilize the probability distribution p(x) by optimizing with a minimum value.

In another embodiment, rather than a minimum value, an average value (e.g., 0.5) can be chosen as a less strict outlier removal condition that can include more high probability data points (thus changing the accuracy of outlier removal), or for other applications/purposes than removing outliers from lane marking data.

In step 531, the filtering module 303 can select every cluster with a normalized probability score lower than, for example, 98th percentile as the final filtered data 533 (e.g., in the diagram 223 in FIG. 2B). A percentile (or a centile) is a score below which a given percentage of scores in its frequency distribution fall (exclusive definition) or a score at or below which a given percentage fall (inclusive definition). For example, the 98th percentile (the median) is the score below which 98% (exclusive) or at or below which (inclusive) 98% of the scores in the distribution may be found. As such, the filtering module 303 can effectively remove outliers from lane marking data without expensive compute nodes, human intervention, or additional data.

In one embodiment, the attribute module 305 can determine a center-line, a boundary, or a combination thereof (e.g., centerlines 233*a*, 233*b*, lane corridors/boundaries 235*a*-235*d*, etc. in FIG. 2C) associated with the road lane based on the final filtered set.

In one embodiment, in step 409, the output module 311 can provide the final filtered set as an output. For instance, the output module 311 can initiate a presentation of the final filtered set on a map user interface.

In one embodiment, the map layer module 307 can generate a road lane map layer based on the final filtered set as discussed with respect to FIGS. 6-7 below, such that the output module 311 can provide the road lane map layer as an output for vehicle navigation, fleet management, or a combination thereof.

In one embodiment, the false rate module 309 can compute a false rate based on the final filtered set associated with one or more sources of the spatial data points as discussed with respect to FIGS. 8-9 below, such that the output module 311 can provide the false rate as an output. In another embodiment, the false rate module 309 can update a fleet management plan for the one or more sources based on the false rate.

Figure 6:
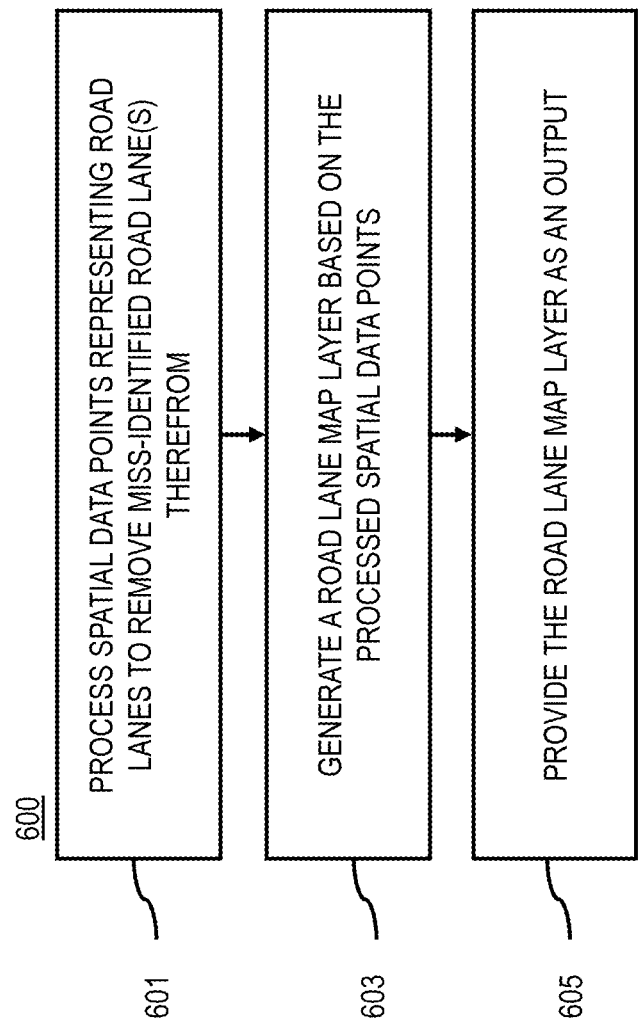
FIG. 6 is a flowchart of a process for providing a road lane map layer, according to one embodiment.

FIG. 6 is a flowchart of a process 600 for providing a road lane map layer, according to one embodiment. In various embodiments, the mapping platform 111, any of the modules 301-311, and/or the machine learning system 125 may perform one or more portions of the process 600 and may be implemented in, for instance, a chip set including a processor and a memory as shown in FIG. 12. As such, the mapping platform 111, any of the modules 301-311, and/or the machine learning system 125 can provide means for accomplishing various parts of the process 600, as well as means for accomplishing embodiments of other processes described herein in conjunction with other components of the system 100. Although the process 600 is illustrated and described as a sequence of steps, it is contemplated that various embodiments of the process 600 may be performed in any order or combination and need not include all of the illustrated steps.

In one embodiment, for example in step 601, the filtering module 303 can work in conjunction with the machine learning system 125 to process spatial data points (e.g., the conflated geoJSON data 241 in FIG. 2D) representing road lanes (e.g., lanes 215 of the diagram 219 in FIG. 2B) to remove one or more miss-identified road lanes (e.g., lanes 217 of the diagram 219 in FIG. 2B) therefrom.

For instance, the spatial data points can be processed by the filtering module 303 into a plurality of clusters, one or more clusters can filtered (e.g., using the first unsupervised learning model 243, such as the OPTICS algorithm) from the plurality of clusters to generate an initial filtered set (i.e., the cluster(s) labeled with "0") of the spatial data points, and the filtering is based on determining that the one or more clusters (i.e., the cluster(s) labeled with "−1", e.g., the outlier 217*a* away from the road 213) is away from at least one main cluster by at least a threshold. A degree of relationship can be calculated by the filtering module 303 among the spatial data points of the initial filtered set (i.e., the cluster(s) labeled with "0") based on a distance metric to generate one or more group nodes of the initial filtered set. For each group node of the one or more group nodes, a probability that a spatial data point belongs in said each group node can be determined by comparing the spatial data point to a center of said each group node, and filtering the spatial data point from said each group node (e.g., using a K-nearest neighbor search (k-NN) of the [lat, long] representation of each data point using the Haversine distance) based on determining that the probability is less than a threshold probability to generate a final filtered set (e.g., as in the diagram 223 of FIG. 2B) of the spatial data points. In this case, the one or more miss-identified road lanes can include the one or more clusters away from the at least one main cluster, the spatial data point with the probability less than the threshold probability, or a combination thereof.

In one embodiment, in step 603, the map layer module 307 can generate a road lane map layer (e.g., a road lane layer 701 in FIG. 7) based on the processed spatial data points. FIG. 7 is a diagram of example map layers, according to one or more example embodiments. For instance, the example map layers can include the road lane layer 701, a slippery road event layer 703, a mobile traffic sign layer 705, an accident map layer 707, etc. FIG. 7 is illustrative in nature, and not restrictive. Other example map layers can include a live traffic layer, a hazard warning layer, a weather layer, a cellular signal strength layer, a parking map layer, and other dynamic map object layers. Other map object layers may not change as often, yet are still applicable for a long time frame, such as a road geometry layer, a point of interest (POI) layer (e.g., a gas station layer), a 3D content layer, an electric vehicle charging station layer, a place footprint layer, etc.

Figure 7:
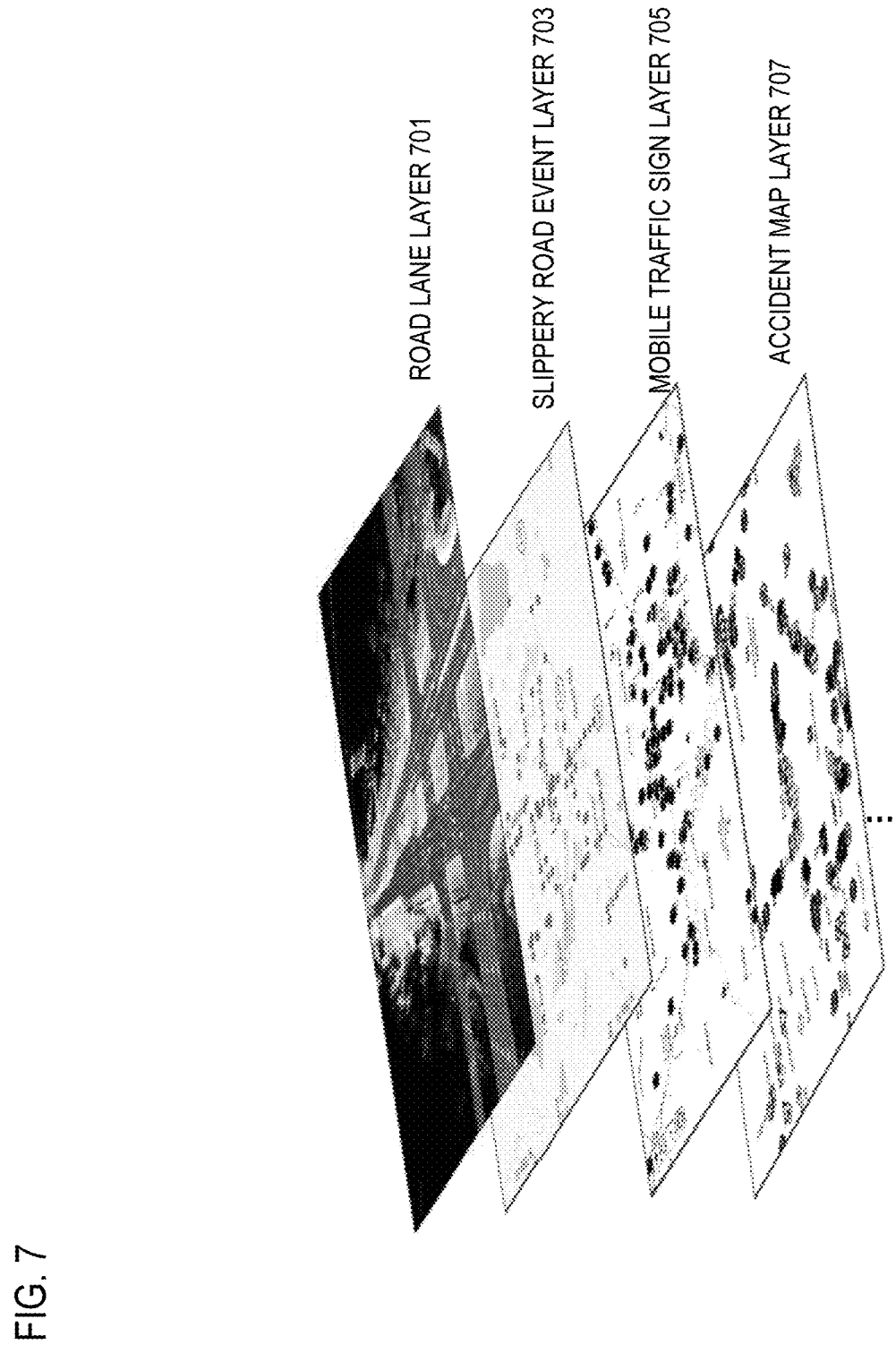
FIG. 7 is a diagram of example map layers, according to one or more example embodiments.

In one embodiment, the attribute module 305 can determine a center-line, a boundary, or a combination thereof (e.g., centerlines 233*a*, 233*b*, lane corridors/boundaries 235*a*-235*d*, etc. in FIG. 2C) associated with each of the road lanes based on the processed spatial data points, and include the center-line, the boundary, or a combination thereof as attributes in the road lane map layer (e.g., the road lane layer 701 in FIG. 7).

In one embodiment, the filtering module 303 can process updates of the spatial data points to remove one or more additional miss-identified road lanes therefrom, and the attribute module 305 can update the road lane map layer based on the processed updates of the spatial data points. In one embodiment, in step 605, the output module 311 can provide the road lane map layer (e.g., the road lane layer 701 in FIG. 7) as an output.

In another embodiment, the miss-identified road lanes can be used as indicators of a monitoring system (e.g., a process 800 in FIG. 8), rather than for removing outliers (e.g., the process 400 in FIG. 4). For instance, when 50% of the spatial data points are outliers, there may be something going wrong with the vehicles 101.

Figure 8:
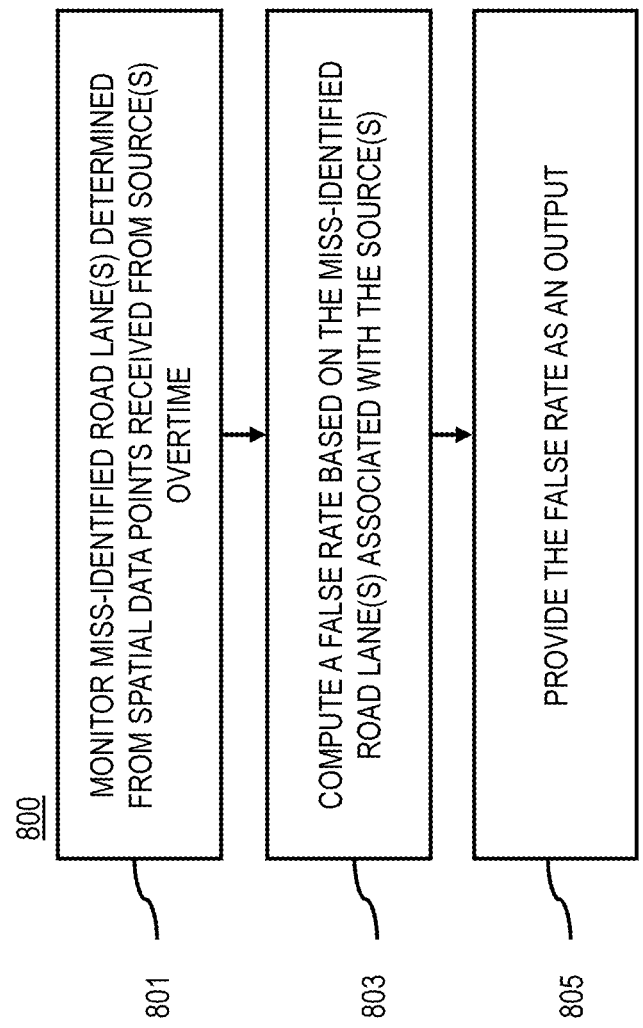
FIG. 8 is a flowchart of a process for providing a false rate and supporting fleet management, according to one embodiment.

FIG. 8 is a flowchart of a process for providing a false rate and supporting fleet management, according to one embodiment. In various embodiments, the mapping platform 111, any of the modules 301-311, and/or the machine learning system 125 may perform one or more portions of the process 800 and may be implemented in, for instance, a chip set including a processor and a memory as shown in FIG. 12. As such, the mapping platform 111, any of the modules 301-311, and/or the machine learning system 125 can provide means for accomplishing various parts of the process 800, as well as means for accomplishing embodiments of other processes described herein in conjunction with other components of the system 100. Although the process 800 is illustrated and described as a sequence of steps, it is contemplated that various embodiments of the process 800 may be performed in any order or combination and need not include all of the illustrated steps.

In one embodiment, for example in step 801, the false rate module 309 can monitor one or more miss-identified road lanes (e.g., lanes 217 of the diagram 219 in FIG. 2B) determined from spatial data points (e.g., the conflated geoJSON data 241 in FIG. 2D) overtime. The spatial data points are received from one or more sources (e.g., OEMs, municipalities or respective geographic authorities, crowd-sourced databases, navigation services, etc.). By way of example, the spatial data points is received by a mapping service provider from one or more sources. The one or more miss-identified road lanes can be removed from the spatial data points by the mapping service provider, the one or more sources, or a combination thereof.

For instance, the spatial data points can be processed by the filtering module 303 into a plurality of clusters, one or more clusters can filtered (e.g., using the first unsupervised learning model 243, such as the OPTICS algorithm) from the plurality of clusters to generate an initial filtered set (i.e., the cluster(s) labeled with "0") of the spatial data points, and the filtering is based on determining that the one or more clusters (i.e., the cluster(s) labeled with "−1", e.g., the outlier 217*a* away from the road 213) is away from at least one main cluster by at least a threshold. A degree of relationship can be calculated by the filtering module 303 among the spatial data points of the initial filtered set (i.e., the cluster(s) labeled with "0") based on a distance metric to generate one or more group nodes of the initial filtered set. For each group node of the one or more group nodes, a probability that a spatial data point belongs in said each group node can be determined by comparing the spatial data point to a center of said each group node, and filtering the spatial data point from said each group node (e.g., using a K-nearest neighbor search (k-NN) of the [lat, long] representation of each data point using the Haversine distance) based on determining that the probability is less than a threshold probability to generate a final filtered set (e.g., as in the diagram 223 of FIG. 2B) of the spatial data points. In this case, the one or more miss-identified road lanes can include the one or more clusters away from the at least one main cluster, the spatial data point with the probability less than the threshold probability, or a combination thereof.

In one embodiment, in step 803, the false rate module 309 can compute a false rate based on the one or more miss-identified road lanes (e.g., lanes 217 of the diagram 219 in FIG. 2B) associated with the one or more sources. The false rate can be a false positive rate (e.g., detect a lane marking where there is none), or a false negative rate (e.g., fail to detect a lane marking where there is one). In real life, missing a lane marking can lead to collisions thus is more dangerous than reporting a non-existing lane marking. In one embodiment, in step 805, the output module 311 can provide the false rate as an output.

In one embodiment, the false rate module 309 can update a fleet management plan for a fleet of vehicles (e.g., of an OEM) based on the false rate, and the fleet of vehicles constitutes at least a portion of the one or more sources.

In another embodiment, the false rate module 309 can determine a replacement rate for the fleet of vehicles based on the false rate, and the fleet management plan includes replacing for the fleet of vehicles based on the replacement rate.

In yet another embodiment, the false rate module 309 can estimate a maintenance status of the fleet of vehicles based on the false rate, and the fleet management plan includes performing maintenance for the fleet of vehicles based on the maintenance status.

Figure 9A:
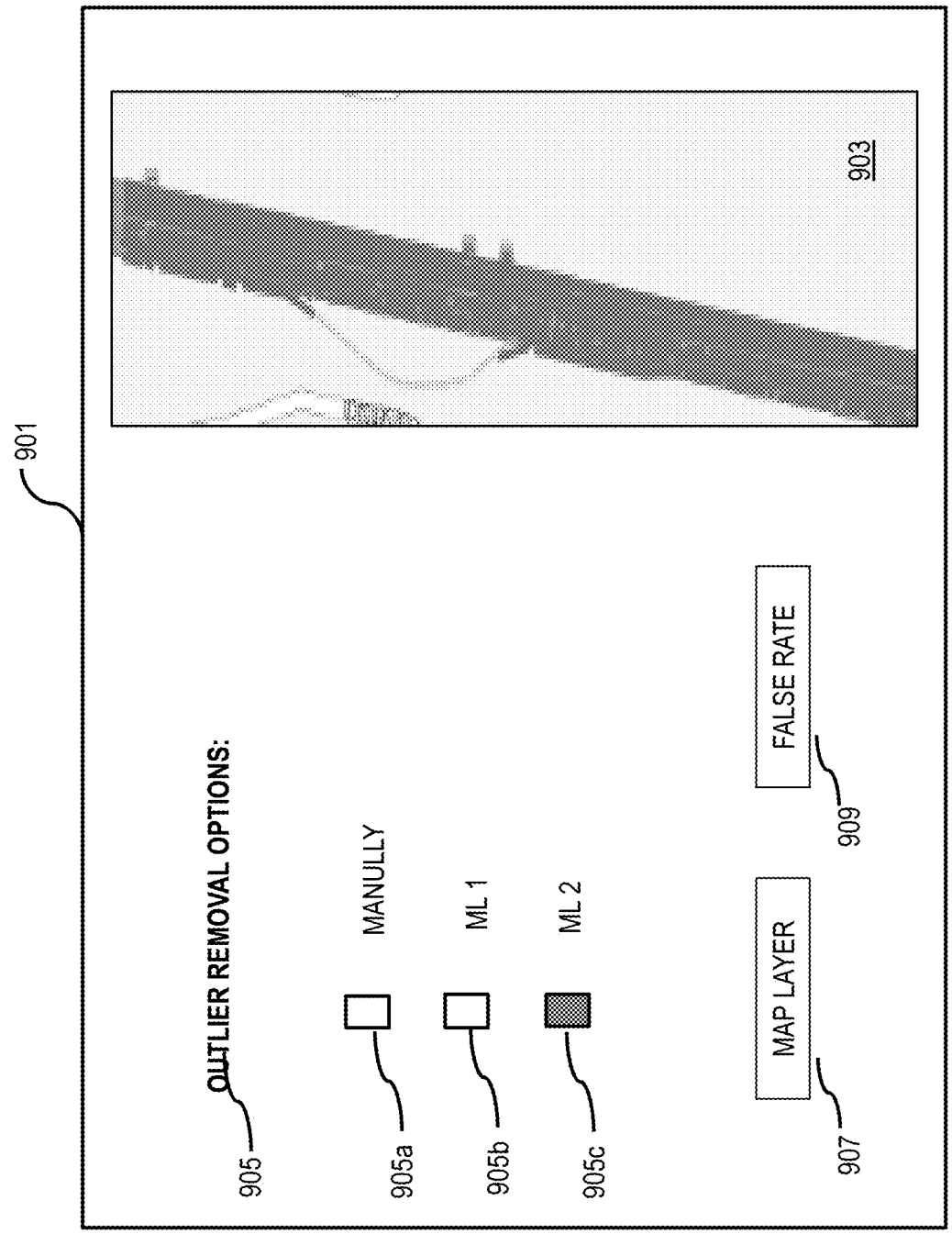
Figure 9B:
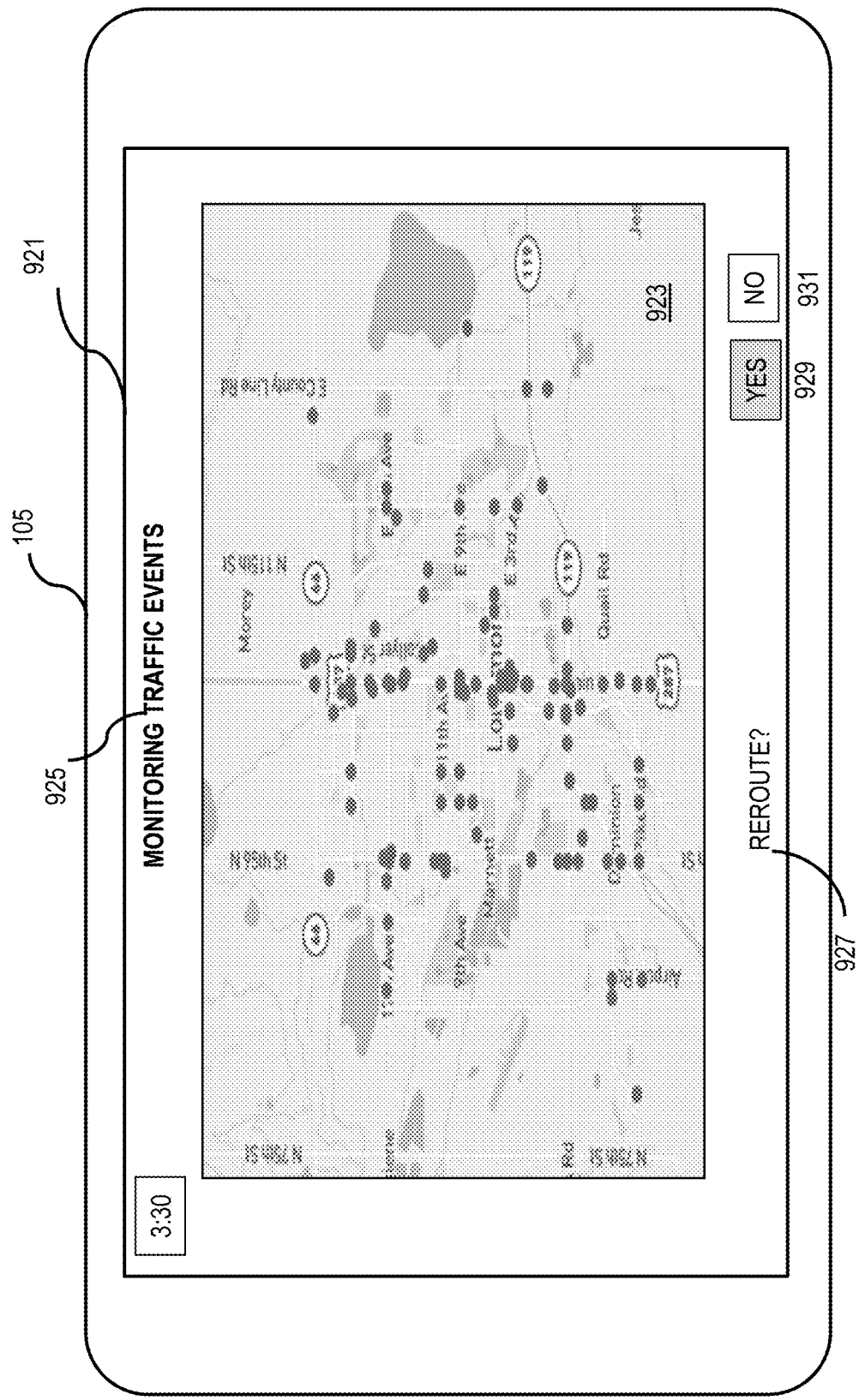

FIGS. 9A-9C are diagrams of example map user interfaces for removing outliers from lane marking data, according to various embodiments. Referring to FIG. 9A, in one embodiment, the system 100 can generate a user interface (UI) 901 (e.g., via the mapping platform 111) for a UE 105 (e.g., a mobile device, a smartphone, a client terminal, etc.) that can allow a user (e.g., a mapping service provider staff, an OEM staff, an end user, etc.) to see spatial data points, lane marking data, etc. currently and/or over time (e.g., an hour, a day, a week, a month, a year, etc.) in an area presented over a map 903. Upon selection of one of the outlier removal options 905, the user can access the data based on a respective option. For instance, the outlier removal options 905 includes a manually option 905*a*, a ML 1 option 905*b*, and a ML 2 option 905*c*. The manually option 905*a* allows the user to move outliers manually. The ML 1 option 905*b* activates the first unsupervised machine learning model and filters outliers away from main cluster(s) as discussed. The ML 2 option 905*c* activates the second unsupervised machine learning model and filters closer outliers as discussed.

In FIG. 9A, the user selects ML 2 option 905*c*, and the map 903 accurately preserves lanes merged from corridors (after the system 100 removes all outliers as discussed). In addition, the user can select a "May Layer" button 907 to proceed with the road lane map layer functions as discussed above, or a "False Rate" button 909 to proceed with the fleet management functions as discussed above.

FIG. 9B is a diagram of an example user interface (UI) 921 capable of presenting lane marking data (after outlier removal), according to one or more example embodiments. In this example, the UI 921 shown is generated for a UE 105 (e.g., a mobile device, an embedded navigation system of a vehicle 101, a client terminal, etc.) that includes a map 923, and a status indication 925 of "Monitoring traffic events" by the system 100. The system 100 is monitoring traffic event signals/reports in the area and moving outliers, in order to present in FIG. 9B only the true lane marking data. The system 100 also presents an option of "reroute" 927 in FIG. 9B for a user can select a "yes" button 929 or a "no" button 931 with respect to rerouting. Accordingly, when the user selects the "yes" button 929, the system 100 can provide the user navigation guidance based on the traffic event reports.

In one instance, the UI 921 could also be presented via a headset, goggle, or eyeglass device used separately or in connection with a UE 105 (e.g., a mobile device). In one embodiment, the system 100 can present or surface the map data, the traffic report data, etc. in multiple interfaces simultaneously (e.g., presenting a 2D map, a 3D map, an augmented reality view, a virtual reality display, or a combination thereof). In one embodiment, the system 100 could also present the map data to the user through other media including but not limited to one or more sounds, haptic feedback, touch, or other sensory interfaces. For example, the system 100 could present the map data through the speakers of a vehicle 101 carrying the user.

In FIG. 9C, the system 100 may provide interactive user interfaces (e.g., of UE 105 associated with the vehicle 101) for reporting detected lane markings as confirmed via user inputs (e.g., crowd-sources via Mechanical Turk (MTurk)®, Crowd Flowers®, etc.). In one scenario, a user interface (UI) 941 of the vehicle 101 depicts a lane marking diagram, and prompts the user with a popup 943: "Confirm detected lane markings?" An operator and/or a passenger of the vehicle 101 can select a "yes" button 945 or a "no" button 947 based on the user's observation (e.g., of lane marking 949).

For example, the user interface can present the UI 941 and/or a physical controller such as but not limited to an interface that enables voice commands, a pressure sensor on a screen or window whose intensity reflects the movement of time, an interface that enables gestures/touch interaction, a knob, a joystick, a rollerball or trackball-based interface, or other sensors. As other examples, the sensors can be any type of sensor that can detect a user's gaze, heartrate, sweat rate or perspiration level, eye movement, body movement, or combination thereof, in order to determine a user response to confirm road events. As such, the system 100 can enable a user to confirm lane markings (e.g., to provide the system 100 as ground truth data).

Figure 10:
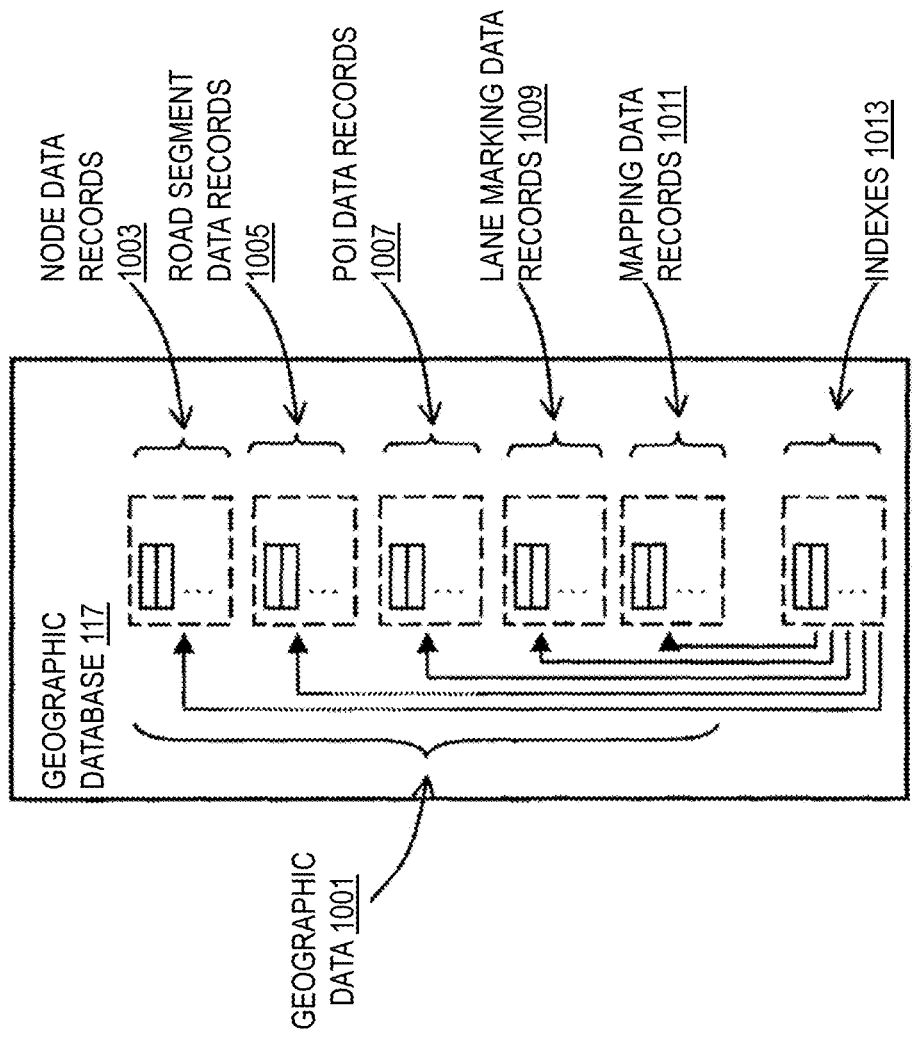
FIG. 10 is a diagram of a geographic database, according to one embodiment.

FIG. 10 is a diagram of a geographic database (such as the database 117), according to one embodiment. In one embodiment, the geographic database 117 includes geographic data 1001 used for (or configured to be compiled to be used for) mapping and/or navigation-related services, such as for video odometry based on the parametric representation of lanes include, e.g., encoding and/or decoding parametric representations into lane lines. In one embodiment, the geographic database 117 include high resolution or high definition (HD) mapping data that provide centimeter-level or better accuracy of map features. For example, the geographic database 117 can be based on Light Detection and Ranging (LiDAR) or equivalent technology to collect billions of 3D points and model road surfaces and other map features down to the number lanes and their widths. In one embodiment, the mapping data (e.g., mapping data records 1011) capture and store details such as the slope and curvature of the road, lane markings, roadside objects such as signposts, including what the signage denotes. By way of example, the mapping data enable highly automated vehicles to precisely localize themselves on the road.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 117.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 117 follows certain conventions. For example, links do not cross themselves and do not cross each other except at a node. Also, there are no duplicated shape points, nodes, or links. Two links that connect each other have a common node. In the geographic database 117, overlapping geographic features are represented by overlapping polygons. When polygons overlap, the boundary of one polygon crosses the boundary of the other polygon. In the geographic database 117, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 117 includes node data records 1003, road segment or link data records 1005, POI data records 1007, lane marking data records 1009, mapping data records 1011, and indexes 1013, for example. More, fewer or different data records can be provided. In one embodiment, additional data records (not shown) can include cartographic ("carto") data records, routing data, and maneuver data. In one embodiment, the indexes 1013 may improve the speed of data retrieval operations in the geographic database 117. In one embodiment, the indexes 1013 may be used to quickly locate data without having to search every row in the geographic database 117 every time it is accessed. For example, in one embodiment, the indexes 1013 can be a spatial index of the polygon points associated with stored feature polygons.

In exemplary embodiments, the road segment data records 1005 are links or segments representing roads, streets, or paths, as can be used in the calculated route or recorded route information for determination of one or more personalized routes. The node data records 1003 are end points (such as intersections) corresponding to the respective links or segments of the road segment data records 1005. The road link data records 1005 and the node data records 1003 represent a road network, such as used by vehicles, cars, and/or other entities. Alternatively, the geographic database 117 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 117 can include data about the POIs and their respective locations in the POI data records 1007. The geographic database 117 can also include data about places, such as cities, towns, or other communities, and other geographic features, such as bodies of water, mountain ranges, etc. Such place or feature data can be part of the POI data records 1007 or can be associated with POIs or POI data records 1007 (such as a data point used for displaying or representing a position of a city).

In one embodiment, the geographic database 117 can also include lane marking data records 1009 for storing sensor data, pre-processed lane marking data, filtered lane marking data, training data, prediction models, annotated observations, computed featured distributions, sampling probabilities, and/or any other data generated or used by the system 100 according to the various embodiments described herein. By way of example, the lane marking data records 1009 can be associated with one or more of the node records 1003, road segment records 1005, and/or POI data records 1007 to support localization or visual odometry based on the features stored therein and the corresponding estimated quality of the features. In this way, the lane marking records 1009 can also be associated with or used to classify the characteristics or metadata of the corresponding records 1003, 1005, and/or 1007.

In one embodiment, as discussed above, the mapping data records 1011 model road surfaces and other map features to centimeter-level or better accuracy. The mapping data records 1011 also include lane models that provide the precise lane geometry with lane boundaries, as well as rich attributes of the lane models. These rich attributes include, but are not limited to, lane traversal information, lane types, lane marking types, lane level speed limit information, and/or the like. In one embodiment, the mapping data records 1011 are divided into spatial partitions of varying sizes to provide mapping data to vehicles 101 and other end user devices with near real-time speed without overloading the available resources of the vehicles 101 and/or devices (e.g., computational, memory, bandwidth, etc. resources).

In one embodiment, the mapping data records 1011 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the mapping data records 1011.

In one embodiment, the mapping data records 1011 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time also at centimeter-level accuracy. Other sensor data can include vehicle telemetry or operational data such as windshield wiper activation state, braking state, steering angle, accelerator position, and/or the like. In one embodiment, certain attributes, such as lane marking data records, mapping data records and/or other attributes can be features or layers associated with the link-node structure of the database.

In one embodiment, the geographic database 117 can be maintained by the content providers 119 in association with the services platform 117 (e.g., a map developer). The map developer can collect geographic data to generate and enhance the geographic database 117. There can be different ways used by the map developer to collect data. These ways can include obtaining data from other sources, such as municipalities or respective geographic authorities. In addition, the map developer can employ field personnel to travel by vehicle (e.g., vehicles 101 and/or user terminals 105) along roads throughout the geographic region to observe features and/or record information about them, for example. Also, remote sensing, such as aerial or satellite photography, can be used.

The geographic database 117 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle 101 or a user terminal 105, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for removing outliers from road lane marking data (using two-phase filtering) may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 11:
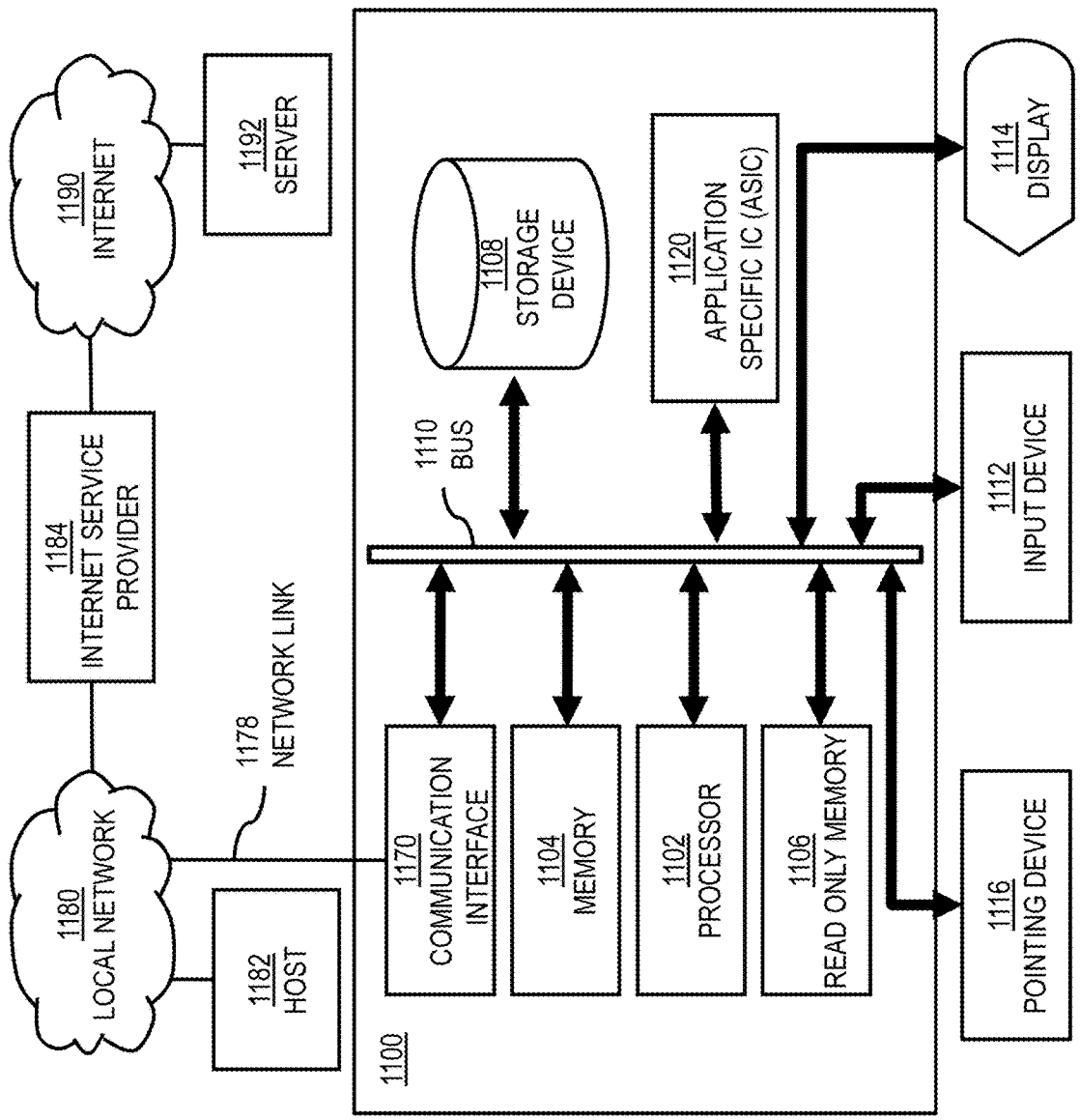
FIG. 11 is a diagram of hardware that can be used to implement an embodiment.

FIG. 11 illustrates a computer system 1100 upon which an embodiment of the invention may be implemented. Computer system 1100 is programmed (e.g., via computer program code or instructions) to remove outliers from road lane marking data using two-phase filtering as described herein and includes a communication mechanism such as a bus 1110 for passing information between other internal and external components of the computer system 1100. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1110 includes one or more parallel conductors of information so that information is transferred quickly among devices coupled to the bus 1110. One or more processors 1102 for processing information are coupled with the bus 1110.

A processor 1102 performs a set of operations on information as specified by computer program code related to removing outliers from road lane marking data using two-phase filtering. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1110 and placing information on the bus 1110. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1102, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1100 also includes a memory 1104 coupled to bus 1110. The memory 1104, such as a random access memory (RAM) or other dynamic storage device, stores information including processor instructions for removing outliers from road lane marking data using two-phase filtering. Dynamic memory allows information stored therein to be changed by the computer system 1100. RAM allows a unit of information stored at a location called a memory address to be stored and retrieved independently of information at neighboring addresses. The memory 1104 is also used by the processor 1102 to store temporary values during execution of processor instructions. The computer system 1100 also includes a read only memory (ROM) 1106 or other static storage device coupled to the bus 1110 for storing static information, including instructions, that is not changed by the computer system 1100. Some memory is composed of volatile storage that loses the information stored thereon when power is lost. Also coupled to bus 1110 is a non-volatile (persistent) storage device 1108, such as a magnetic disk, optical disk or flash card, for storing information, including instructions, that persists even when the computer system 1100 is turned off or otherwise loses power.

Information, including instructions for removing outliers from road lane marking data using two-phase filtering, is provided to the bus 1110 for use by the processor from an external input device 1112, such as a keyboard containing alphanumeric keys operated by a human user, or a sensor. A sensor detects conditions in its vicinity and transforms those detections into physical expression compatible with the measurable phenomenon used to represent information in computer system 1100. Other external devices coupled to bus 1110, used primarily for interacting with humans, include a display device 1114, such as a cathode ray tube (CRT) or a liquid crystal display (LCD), or plasma screen or printer for presenting text or images, and a pointing device 1116, such as a mouse or a trackball or cursor direction keys, or motion sensor, for controlling a position of a small cursor image presented on the display 1114 and issuing commands associated with graphical elements presented on the display 1114. In some embodiments, for example, in embodiments in which the computer system 1100 performs all functions automatically without human input, one or more of external input device 1112, display device 1114 and pointing device 1116 is omitted.

In the illustrated embodiment, special purpose hardware, such as an application specific integrated circuit (ASIC) 1120, is coupled to bus 1110. The special purpose hardware is configured to perform operations not performed by processor 1102 quickly enough for special purposes. Examples of application specific ICs include graphics accelerator cards for generating images for display 1114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1100 also includes one or more instances of a communications interface 1170 coupled to bus 1110. Communication interface 1170 provides a one-way or two-way communication coupling to a variety of external devices that operate with their own processors, such as printers, scanners and external disks. In general the coupling is with a network link 1178 that is connected to a local network 1180 to which a variety of external devices with their own processors are connected. For example, communication interface 1170 may be a parallel port or a serial port or a universal serial bus (USB) port on a personal computer. In some embodiments, communications interface 1170 is an integrated services digital network (ISDN) card or a digital subscriber line (DSL) card or a telephone modem that provides an information communication connection to a corresponding type of telephone line. In some embodiments, a communication interface 1170 is a cable modem that converts signals on bus 1110 into signals for a communication connection over a coaxial cable or into optical signals for a communication connection over a fiber optic cable. As another example, communications interface 1170 may be a local area network (LAN) card to provide a data communication connection to a compatible LAN, such as Ethernet. Wireless links may also be implemented. For wireless links, the communications interface 1170 sends or receives or both sends and receives electrical, acoustic or electromagnetic signals, including infrared and optical signals, that carry information streams, such as digital data. For example, in wireless handheld devices, such as mobile telephones like cell phones, the communications interface 1170 includes a radio band electromagnetic transmitter and receiver called a radio transceiver. In certain embodiments, the communications interface 1170 enables connection to the communication network 113 for removing outliers from road lane marking data using two-phase filtering.

The term computer-readable medium is used herein to refer to any medium that participates in providing information to processor 1102, including instructions for execution. Such a medium may take many forms, including, but not limited to, non-volatile media, volatile media and transmission media. Non-volatile media include, for example, optical or magnetic disks, such as storage device 1108. Volatile media include, for example, dynamic memory 1104. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 1178 typically provides information communication using transmission media through one or more networks to other devices that use or process the information. For example, network link 1178 may provide a connection through local network 1180 to a host computer 1182 or to equipment 1184 operated by an Internet Service Provider (ISP). ISP equipment 1184 in turn provides data communication services through the public, world-wide packet-switching communication network of networks now commonly referred to as the Internet 1190.

A computer called a server host 1192 connected to the Internet hosts a process that provides a service in response to information received over the Internet. For example, server host 1192 hosts a process that provides information representing video data for presentation at display 1114. It is contemplated that the components of system can be deployed in various configurations within other computer systems, e.g., host 1182 and server 1192.

FIG. 12 illustrates a chip set 1200 upon which an embodiment of the invention may be implemented. Chip set 1200 is programmed to remove outliers from road lane marking data using two-phase filtering as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform the inventive steps described herein to remove outliers from road lane marking data using two-phase filtering. The memory 1205 also stores the data associated with or generated by the execution of the inventive steps.

Figure 13:
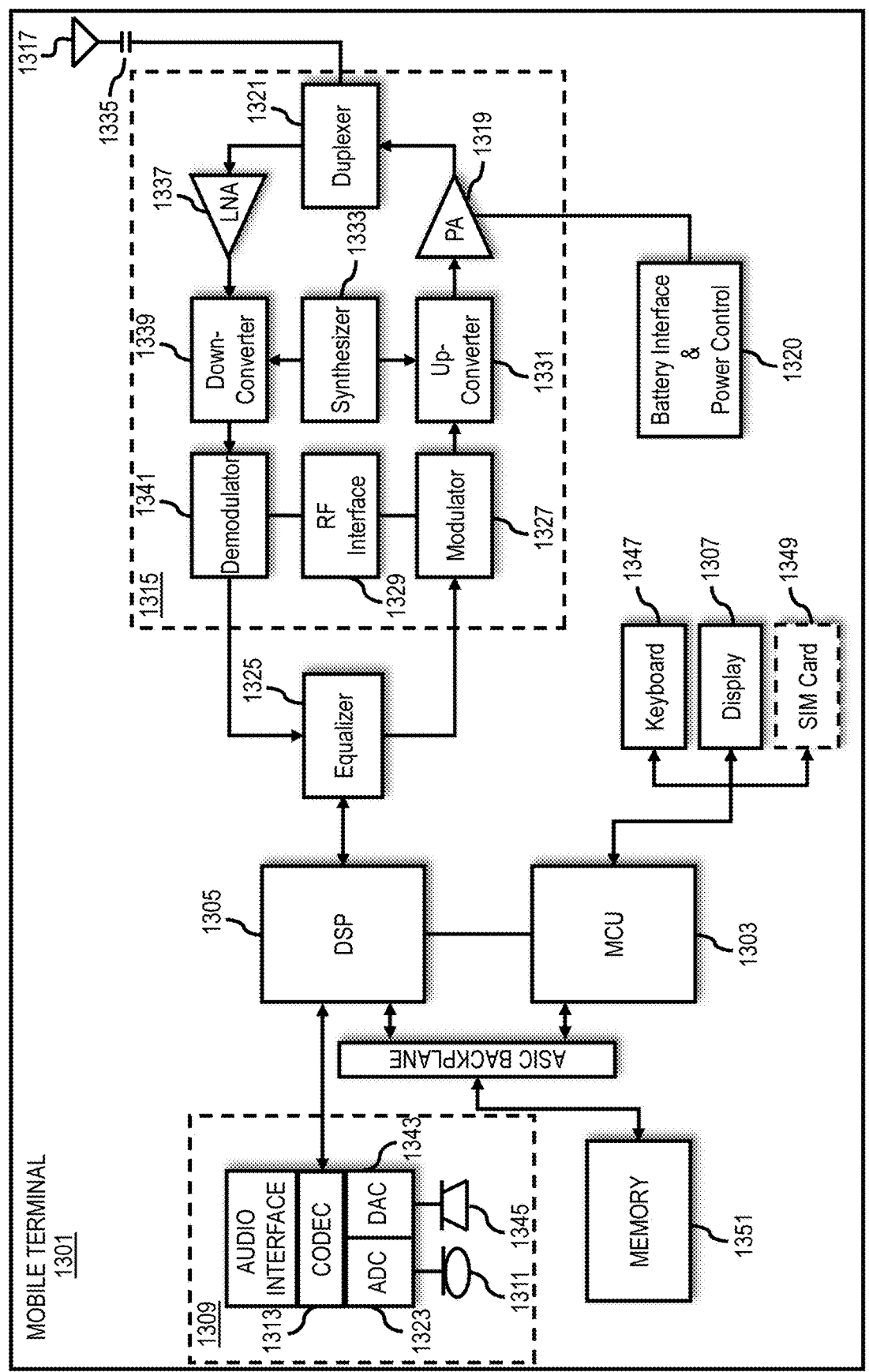
FIG. 13 is a diagram of a mobile terminal (e.g., handset or vehicle or part thereof) that can be used to implement an embodiment.

FIG. 13 is a diagram of exemplary components of a mobile terminal 1301 (e.g., handset or vehicle or part thereof) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1303, a Digital Signal Processor (DSP) 1305, and a receiver/transmitter unit including a microphone gain control unit and a speaker gain control unit. A main display unit 1307 provides a display to the user in support of various applications and mobile station functions that offer automatic contact matching. An audio function circuitry 1309 includes a microphone 1311 and microphone amplifier that amplifies the speech signal output from the microphone 1311. The amplified speech signal output from the microphone 1311 is fed to a coder/decoder (CODEC) 1313.

A radio section 1315 amplifies power and converts frequency in order to communicate with a base station, which is included in a mobile communication system, via antenna 1317. The power amplifier (PA) 1319 and the transmitter/modulation circuitry are operationally responsive to the MCU 1303, with an output from the PA 1319 coupled to the duplexer 1321 or circulator or antenna switch, as known in the art. The PA 1319 also couples to a battery interface and power control unit 1320.

In use, a user of mobile station 1301 speaks into the microphone 1311 and his or her voice along with any detected background noise is converted into an analog voltage. The analog voltage is then converted into a digital signal through the Analog to Digital Converter (ADC) 1323. The control unit 1303 routes the digital signal into the DSP 1305 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1325 for compensation of any frequency-dependent impairments that occur during transmission though the air such as phase and amplitude distortion. After equalizing the bit stream, the modulator 1327 combines the signal with a RF signal generated in the RF interface 1329. The modulator 1327 generates a sine wave by way of frequency or phase modulation. In order to prepare the signal for transmission, an up-converter 1331 combines the sine wave output from the modulator 1327 with another sine wave generated by a synthesizer 1333 to achieve the desired frequency of transmission. The signal is then sent through a PA 1319 to increase the signal to an appropriate power level. In practical systems, the PA 1319 acts as a variable gain amplifier whose gain is controlled by the DSP 1305 from information received from a network base station. The signal is then filtered within the duplexer 1321 and optionally sent to an antenna coupler 1335 to match impedances to provide maximum power transfer. Finally, the signal is transmitted via antenna 1317 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1301 are received via antenna 1317 and immediately amplified by a low noise amplifier (LNA) 1337. A down-converter 1339 lowers the carrier frequency while the demodulator 1341 strips away the RF leaving only a digital bit stream. The signal then goes through the equalizer 1325 and is processed by the DSP 1305. A Digital to Analog Converter (DAC) 1343 converts the signal and the resulting output is transmitted to the user through the speaker 1345, all under control of a Main Control Unit (MCU) 1303—which can be implemented as a Central Processing Unit (CPU) (not shown).

The MCU 1303 receives various signals including input signals from the keyboard 1347. The keyboard 1347 and/or the MCU 1303 in combination with other user input components (e.g., the microphone 1311) comprise a user interface circuitry for managing user input. The MCU 1303 runs a user interface software to facilitate user control of at least some functions of the mobile station 1301 to remove outliers from road lane marking data using two-phase filtering. The MCU 1303 also delivers a display command and a switch command to the display 1307 and to the speech output switching controller, respectively. Further, the MCU 1303 exchanges information with the DSP 1305 and can access an optionally incorporated SIM card 1349 and a memory 1351. In addition, the MCU 1303 executes various control functions required of the station. The DSP 1305 may, depending upon the implementation, perform any of a variety of conventional digital processing functions on the voice signals. Additionally, DSP 1305 determines the background noise level of the local environment from the signals detected by microphone 1311 and sets the gain of microphone 1311 to a level selected to compensate for the natural tendency of the user of the mobile station 1301.

The CODEC 1313 includes the ADC 1323 and DAC 1343. The memory 1351 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1351 may be, but not limited to, a single memory, CD, DVD, ROM, RAM, EEPROM, optical storage, or any other non-volatile or non-transitory storage medium capable of storing digital data.

An optionally incorporated SIM card 1349 carries, for instance, important information, such as the cellular phone number, the carrier supplying service, subscription details, and security information. The SIM card 1349 serves primarily to identify the mobile station 1301 on a radio network. The card 1349 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    processing spatial data points representing a road lane into a plurality of clusters;
    filtering one or more clusters from the plurality of clusters to generate an initial filtered set of the spatial data points, wherein the filtering is based on determining that the one or more clusters is away from at least one main cluster by at least a threshold;
    calculating a degree of relationship among the spatial data points of the initial filtered set based on a distance metric to generate one or more group nodes of the initial filtered set, wherein a group node is a center of a spatial data point group, regardless of density in the spatial data point group;
    for each group node of the one or more group nodes, determining a probability that a spatial data point belongs in said each group node based on a relative distance from the spatial data point to a center of said each group node, and filtering the spatial data point from said each group node based on determining that the probability is less than a threshold probability to generate a final filtered set of the spatial data points; and
    providing the final filtered set as an output.

2. The method of claim 1, wherein the processing of the spatial data points into the plurality of clusters is performed using unsupervised cluster labeling.

3. The method of claim 2, wherein the unsupervised cluster labeling is based on an unsupervised machine learning model that learns an intrinsic cluster structure of the spatial data points from an absolute distance represented by a lowest epsilon neighborhood that satisfies a minimum number of points that stand for a lane distance.

4. The method of claim 1, wherein the generating of the one or more group nodes is based on an unsupervised machine learning model that computes a nearest neighbor search using the distance metric and returns the one or more group nodes and the relative distances of the one or more group nodes.

5. The method of claim 4, wherein the nearest neighbor search is K-nearest neighbor search.

6. The method of claim 1, wherein the distance metric is a Haversine distance.

7. The method of claim 1, further comprising:
determining a center-line, a boundary, or a combination thereof associated with the road lane based on the output.

8. The method of claim 1, wherein the probability of said spatial data point is determined by:
computing a local reachability density by averaging a reachability distance from the spatial data point of said each group node to neighboring data points in said each group node;
computing an average local reachability density of the neighboring data points in said each group node; and
dividing the average local reachability density by the local reachability density to determine a local density probability,
wherein the spatial data point is filtered from said each group node based on determining that the local density probability is less than a threshold probability.

9. The method of claim 1, further comprising:
initiating a presentation of the final filtered set on a map user interface.

10. The method of claim 1, further comprising:
generating a road lane map layer based on the final filtered set; and
providing the road lane map layer as an output for vehicle navigation, fleet management, or a combination thereof.

11. The method of claim 1, further comprising:
computing a false rate based on the final filtered set associated with one or more sources of the spatial data points; and
providing the false rate as an output.

12. The method of claim 11, further comprising:
updating a fleet management plan for the one or more sources based on the false rate.

13. An apparatus comprising:
at least one processor; and
at least one memory including computer program code for one or more programs,
the at least one memory and the computer program code configured to, with the at least one processor, cause the apparatus to perform at least the following,
process spatial data points representing road lanes to remove one or more miss-identified road lanes therefrom; and
generate a road lane map layer based on the processed spatial data points; and
provide the road lane map layer as an output,
wherein the spatial data points are processed into a plurality of clusters, one or more clusters are filtered from the plurality of clusters to generate an initial filtered set of the spatial data points, and the filtering is based on determining that the one or more clusters is away from at least one main cluster by at least a threshold, wherein a degree of relationship is calculated among the spatial data points of the initial filtered set based on a distance metric to generate one or more group nodes of the initial filtered set, and wherein a group node is a center of a spatial data point group, regardless of density in the spatial data point group, wherein for each group node of the one or more group nodes, a probability that a spatial data point belongs in said each group node is determined based on a relative distance from the spatial data point to a center of said each group node, and filtering the spatial data point from said each group node based on determining that the probability is less than a threshold probability to generate a final filtered set of the spatial data points, and wherein the one or more miss-identified road lanes include the one or more clusters away from the at least one main cluster, the spatial data point with the probability less than the threshold probability, or a combination thereof.

14. The apparatus of claim 13, wherein the apparatus is further caused to:
determine a center-line, a boundary, or a combination thereof associated with each of the road lanes based on the processed spatial data points; and
include the center-line, the boundary, or a combination thereof as attributes in the road lane map layer.

15. The apparatus of claim 13, wherein the apparatus is further caused to:
process updates of the spatial data points to remove one or more additional miss-identified road lanes therefrom; and
update the road lane map layer based on the processed updates of the spatial data points.

16. The apparatus of claim 13, wherein the spatial data points is received by a mapping service provider from one or more sources, and
wherein the one or more miss-identified road lanes are removed from the spatial data points by the mapping service provider, the one or more sources, or a combination thereof.

17. A non-transitory computer-readable storage medium carrying one or more sequences of one or more instructions which, when executed by one or more processors, cause an apparatus to perform:
monitoring one or more miss-identified road lanes determined from spatial data points overtime, wherein the spatial data points are received from one or more sources;
computing a false rate based on the one or more miss-identified road lanes associated with the one or more sources; and
providing the false rate as an output,
wherein the spatial data points are processed into a plurality of clusters, one or more clusters are filtered from the plurality of clusters to generate an initial filtered set of the spatial data points, and the filtering is based on determining that the one or more clusters is away from at least one main cluster by at least a threshold, wherein a degree of relationship is calculated among the spatial data points of the initial filtered set based on a distance metric to generate one or more group nodes of the initial filtered set, and wherein a group node is a center of a spatial data point group, regardless of density in the spatial data point group, wherein for each group node of the one or more group nodes, a probability that a spatial data point belongs in said each group node is determined based on a relative distance from the spatial data point to a center of said each group node, and filtering the spatial data point from said each group node based on determining that the probability is less than a threshold probability to generate a final filtered set of the spatial data points, and wherein the one or more miss-identified road lanes include the one or more clusters away from the at least one main cluster, the spatial data point with the probability less than the threshold probability, or a combination thereof.

18. The non-transitory computer-readable storage medium of claim 17, wherein the apparatus is caused to further perform:
   updating a fleet management plan for a fleet of vehicles based on the false rate, wherein the fleet of vehicles constitutes at least a portion of the one or more sources.

19. The non-transitory computer-readable storage medium of claim 18, wherein the apparatus is caused to further perform:
   determining a replacement rate for the fleet of vehicles based on the false rate,
   wherein the fleet management plan includes replacing for the fleet of vehicles based on the replacement rate.

20. The non-transitory computer-readable storage medium of claim 18, wherein the apparatus is caused to further perform:
   estimating a maintenance status of the fleet of vehicles based on the false rate,
   wherein the fleet management plan includes performing maintenance for the fleet of vehicles based on the maintenance status.

\* \* \* \* \*